US009110185B2

(12) United States Patent
Klopping et al.

(10) Patent No.: US 9,110,185 B2
(45) Date of Patent: Aug. 18, 2015

(54) POLARIZED BEAM, MATCHED COINCIDENT BEAM PATH, INTERFEROMETRIC GRADIOMETER APPARATUS AND METHOD

(71) Applicant: Micro-g LaCoste, Inc., Lafayette, CO (US)

(72) Inventors: Fred J. Klopping, Longmont, CO (US); Timothy M. Niebauer, Boulder, CO (US); Ryan M. Billson, Loveland, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 479 days.

(21) Appl. No.: 13/797,451

(22) Filed: Mar. 12, 2013

(65) Prior Publication Data

US 2014/0260605 A1 Sep. 18, 2014

(51) Int. Cl.
*G01V 7/14* (2006.01)

(52) U.S. Cl.
CPC ........................................ *G01V 7/14* (2013.01)

(58) Field of Classification Search
USPC ............. 73/382 R, 382 G; 356/28.5; 359/529
See application file for complete search history.

(56) References Cited

U.S. PATENT DOCUMENTS

| 3,688,584 | A | * | 9/1972 | Stone et al. | 73/382 R |
|---|---|---|---|---|---|
| 3,693,451 | A | | 9/1972 | Dunlap et al. | |
| 3,704,626 | A | * | 12/1972 | Stone | 73/382 R |
| 3,727,462 | A | * | 4/1973 | Stone et al. | 73/382 R |
| 3,865,467 | A | | 2/1975 | Von Thuna | |
| 5,305,088 | A | * | 4/1994 | Hosoe | 356/487 |
| 5,351,122 | A | | 9/1994 | Niebauer et al. | |
| 5,892,151 | A | | 4/1999 | Niebauer et al. | |
| 6,325,172 | B1 | | 12/2001 | Langridge et al. | |
| 2003/0081218 | A1 | * | 5/2003 | Orban | 356/450 |
| 2008/0034855 | A1 | | 2/2008 | Peeters | |
| 2009/0219546 | A1 | * | 9/2009 | Benischek | 356/482 |
| 2011/0046913 | A1 | | 2/2011 | Hilby | |
| 2013/0205894 | A1 | * | 8/2013 | Rothleitner | 73/382 R |
| 2014/0026654 | A1 | * | 1/2014 | Klopping et al. | 73/382 G |
| 2014/0026655 | A1 | * | 1/2014 | Klopping et al. | 73/382 R |
| 2014/0224012 | A1 | * | 8/2014 | Klopping et al. | 73/382 G |

FOREIGN PATENT DOCUMENTS

| CN | 102323624 A | 1/2012 |
|---|---|---|
| EP | 0433008 A2 | 6/1991 |

(Continued)

OTHER PUBLICATIONS

PCT International Search Report with attached Written Opinion of the International Searching Authority for International Application No. PCT/US2014/018912, dated Oct. 31, 2014, 22 pages.

(Continued)

*Primary Examiner* — Helen Kwok
(74) *Attorney, Agent, or Firm* — John R. Ley

(57) ABSTRACT

A gravity gradient is measured interferometrically from two polarized light beams having mutually different polarization planes which reflect from opposite surfaces of two freefalling test masses. The two polarized light beams project along matched coincident beam paths and divert from the coincident paths to interact with the freefalling test masses. An enhanced level of common mode rejection of adverse influences arises from traversing the coincident beam paths.

36 Claims, 9 Drawing Sheets

(56) References Cited

FOREIGN PATENT DOCUMENTS

| | | |
|---|---|---|
| EP | 0433008 A3 | 6/1991 |
| EP | 2348338 A1 | 7/2011 |
| FR | 2089057 A5 | 1/1972 |
| WO | 2011/086020 A1 | 7/2011 |

OTHER PUBLICATIONS

L. F. Vitushkin et al., "Ballistic Gradiometer for the Measurement of the Vertical Gravity Gradient: A Proposal," Proceedings of the IAG Symposium on Airborne Gravity Field Determination at the IUGG XXI General Assembly, Calgary, Aug. 1995, 200 pages, retrieved from the Internet: URL:http://www.ucalgary.ca/engo_webdocs/SpecialPublications/Proceedings_IAGSymposiumOnAirborneGravityFieldDetermination_1995.pdf.

PCT International Search Report with attached Written Opinion of the International Searching Authority for International Application No. PCT/US2014/019045, dated Jun. 23, 2014, 10 pages.

Christian Rothleitner, "Ultra-high Precision, Absolute, Earth Gravity Measurements," dissertation, 2008, pp. 1-160, University Erlangen-Nuremberg, Berlin, Germany.

C. Rothleitner et al., "A method for adjusting the centre of mass of a freely falling body in absolute gravimetry," 2007, pp. 234-241, IOP Publishing, Metrologia, Bristol, Great Britain.

A. Vitouchkine et al., "Short Communication—A direct and sensitive method for positioning the centre of mass of a dropping object at the optical centre of the enclosed corner cube in ballistic absolute gravimeters," 2004, pp. L19-L21, Institute of Physics Publishing, Metrologia, Bristol, Great Britain.

T. Niebauer et al., "A new generation of absolute gravimeters," 1995, pp. 159-180, Metrologia.

* cited by examiner

POLARIZED BEAM, MATCHED COINCIDENT BEAM PATH, INTERFEROMETRIC GRADIOMETER APPARATUS AND METHOD

CROSS REFERENCE TO RELATED APPLICATIONS

This invention is related to an invention for a "Polarized Beam Director and Method," described in U.S. patent application Ser. No. 13/797,553, filed concurrently herewith by the present inventors and assigned to the assignee hereof. This invention also makes use of an invention for a "Test Mass and Method for Interferometric Gravity Characteristic Measurement," described in U.S. patent application Ser. No. 13/564,548, filed Aug. 1, 2012, by the inventors herein and assigned to the assignee hereof, now U.S. Pat. No. 8,931,341. The descriptions in these US patent applications are incorporated herein by this reference.

FIELD OF THE INVENTION

This invention relates to measuring a characteristic of gravity, and more specifically, to a new and improved interferometric gradiometer and method, which employs multiple test masses and polarized light beams which are matched and coincident over substantial portions of beam paths to commonly reject the optical effects of anomalous mechanical vibrations and perturbations of the stationary optical elements of the gradiometer, thereby enhancing the accuracy of the measurement and facilitating use of the gradiometer on dynamic platforms such as moving vehicles.

BACKGROUND OF THE INVENTION

Gravity is the force of inherent natural attraction between two massive bodies. The magnitude of the gravitational force is directly related to the mass of the bodies and is inversely related to the square of the distance between centers of mass of the two attracted bodies.

Gravity is measured as acceleration, g, usually as a vertical vector component. The freefall acceleration, g, of an object near the surface of the earth is given to a first approximation by the gravitational attraction of an object with the mass of the entire earth, $M_e$, located at the center of the earth, a distance, $R_e$, from the surface of the earth. This nominal gravity value, $g=G\times M_e/R_e^2$, is about 9.8 m/s$^2$. Thus, the freefall acceleration due to gravity near the earth's surface of an object having a small mass compared to the mass of the earth is about 9.8 m/s$^2$. The common unit of measurement for gravity is the "Galileo" (Gal), which is a unit of acceleration defined as 1 cm/s$^2$. One Gal generally approximates $1/1000$ ($10^{-3}$) of the force of gravity at the earth's surface.

An instrument which measures gravity is called a "gravimeter." The most accurate gravimeters are absolute gravimeters. A typical interferometric absolute gravimeter uses a freely falling test mass and a laser or single-frequency light beam which impinges upon and reflects from the freely falling test mass. The path length of the light beam changes as it is reflected from the freely falling test mass. The reflected light beam is combined with a reference light beam to develop interference fringes. Interference fringes are instances where the amplitude or intensity of the reflected and reference light beams add together to create increased intensity, separated by instances where the two beams cancel or create diminished intensity.

Fringes occur on a periodic basis depending upon the relative change in the optical path lengths of two combined light beams. One fringe occurs whenever the optical path length difference changes by one wavelength. When the beam path reflects from a moving object, the beam path length changes by twice the amount of physical movement, because the physical movement changes both the impinging and reflection paths of the light beam. For reflections, a fringe typically occurs when the object moves by one-half of a wavelength. The fringes taken together as a set comprise a record of the distance that the object moves.

The occurrence and timing of the resulting interference fringes defines the characteristic of gravity, because the gravity establishes the freefall movement of the test mass. The use of optical fringe interferometry to measure gravity characteristics is well-known, as is described in U.S. Pat. No. 5,351,122.

A gradient of gravity is the rate at which gravity changes over a certain distance. A gravity gradient is therefore the change or first derivative of the gravity over distance. An instrument used to measure a gradient of gravity is called a "gradiometer."

Although the gradient of gravity can be determined in any direction, the vertical gradient of gravity is useful in many practical applications. Vertical gravity gradients identify changes in density or mass of a particular material or geological structure. For example, gravity gradients are used to establish the location of underground geological structures, such as a pool of liquid petroleum encased within an earth formation, narrow seams or "tubes" of high density geological materials such as diamonds or cobalt, or voids in a geographical formation caused by a tunnel or cavern. These changes in the subterranean material density are most measurable within a relatively short near-field distance, typically within a few hundred meters.

Subsurface density anomalies, for example from valuable nearby high density ore bodies or voids caused by tunnels or areas of low density material, affect the local value of gravity, g, at a level of about 1 part per million ($1/10^6$), and in some cases 1 part per billion ($1/10^9$). The large background of the earth's gravity requires that any direct gravity measurement to detect such subsurface anomalies have a very large dynamic range of parts per billion, otherwise direct gravity measurements will not be possible or accurate. It is difficult to make gravimeters with such levels of extremely high precision, so it is desirable to find ways to cancel the large effect of the earth's gravity while preserving the ability to detect gradations in nearby density anomalies.

The vertical gravity gradient of the earth is typically measured in terms of a unit called the Eotvos unit, E, given by $10^{-9}/s^2$. The vertical gravity gradient of the entire earth is typically about 3000E. Typical nearby mass anomalies can affect the vertical gravity gradient at a level of about 1E or more. Thus, the contrast of the vertical gravity gradient caused by nearby mass anomalies to the earth's vertical gravity gradient is about 300,000 ($3\times10^5$) times larger than for the gravity value itself. This means that a vertical gravity gradiometer can have $3\times10^5$ times less precision than a gravimeter and still be used effectively to detect or locate nearby mass or density anomalies.

A gradiometer removes the background effect of gravity. Logically, a gradiometer differences the gravity measurements at two different nearby locations. A known vertical gravity gradiometer is made by placing two gravimeters above one other with a vertical separation of fixed distance, z, and then subtracting the two gravity measurements, $g_1$ and $g_2$. The vertical gravity gradient, $\gamma$, is then given by the ratio of this difference divided by the vertical separation, i.e. $\gamma=(g_2-g_1)/z$. This quantity is also mathematically referred to as the spatial derivative of gravity in the vertical direction.

Although implementing a gradiometer is conceptually straightforward, the practical reality of doing so involves many significant and practical problems. Using two gravimeters, one above the other, subtracting their absolute measurements and dividing by the distance between the two gravimeters, almost invariably leads to inaccurate measurements. Each gravimeter is subject to many naturally-occurring and man-made vibrations and other physical perturbations. These effects influence each gravimeter differently. These vibrations and perturbations cause minute changes in the path length of the light beams, causing anomalous interference fringes which are unrelated to the gravity characteristic under measurement and thereby reduce the accuracy of the measurement, or at minimum enhance the potential for errors.

Attempts have been made to employ common mode rejection to eliminate the anomalous vibration and perturbation errors in interferometric gravimeters and gradiometers. Since it is virtually impossible to control anomalous vibrations and perturbations, attempts to achieve common mode rejection involve subjecting the light beams to the same physical influences, thereby allowing the same anomalous influences to equally affect both light beams. Theoretically, when the two light beams are combined, the anomalous common error in both signals is theoretically canceled or rejected because of the cancellation of those effects resulting from the combination.

One effective use of common mode rejection in an interferometric gradiometer is described in U.S. patent application Ser. No. 13/558,138, filed Jul. 25, 2012 by the inventors herein and assigned to the assignee hereof, now U.S. Pat. No. 8,978,465. In this prior invention, two separate light beams which traverse separate beam paths impinge upon and reflect from two separate freely falling test masses. Any vibration and perturbation anomalies of the test masses are effectively canceled by common mode rejection. In this regard the prior invention is a substantial improvement over previously known gravimeters.

However, the stationary optical elements, which direct the two separate light beams, are subject to individually separate and different anomalous vibrations and perturbations which adversely influence the lengths of each of the two light beams separately and uniquely. Combining the beams to create the fringes does not achieve common mode cancellation of these separate and unique adverse influences, but instead may create anomalous fringes which lead to measurements of compromised accuracy.

SUMMARY OF THE INVENTION

The present invention solves or ameliorates many problems of optical interferometric gradiometers or acceleration measuring instruments which use free falling test masses to obtain differential gravity or differential acceleration measurements. An enhanced level of common mode rejection of error-inducing adverse influences from physical perturbation and vibration of the optical elements which direct the light beams to and from the free falling test masses is obtained. The improvements of the present invention, coupled with the common mode rejection of adverse influences on the free falling test masses, substantially increases the accuracy of gravity gradient measurements. Accurate gravity gradient measurements become possible in many commercial and industrial applications where prior accurate measurements were difficult or possible to obtain, such as in land, sea, air and space vehicles. These and other features and benefits are achieved by aspects of the invention, which are generally summarized below.

One aspect of the invention involves an interferometric gradiometer which uses first and second light beams having respectively different planes of polarization. Optical elements direct the different polarized light beams in a coincident beam path. The optical elements also divert the first light beam from the coincident beam path to impinge upon and reflect from an upper surface of an upper freefalling test mass and a lower surface a lower freefalling test mass, and divert the second light beam from the coincident beam path to impinge upon and reflect from a lower surface of the upper freefalling test mass and an upper surface of the lower freefalling test mass. Because of the different polarizations of the first and second light beams allow them to carry their own unique information, the first and second light beams may occupy the same coincident path and be subject to the same adverse influences from external perturbations yet still have those adverse influences eliminated by common mode rejection when the two light beams are combined interferometrically to derive the gradient of gravity information.

The optical elements of the interferometric gravimeter may also direct each diverted light beam to impinge upon and reflect from each of the surfaces of each of the test masses multiple times before rejoining the coincident beam path, and the optical elements may rotate each of the diverted first and second light beams before the light beams rejoin the coincident path. The optical elements may include beam directors which divert the first and second light beams from the coincident beam path into first and second beam path segments while the other light beam remains in the coincident beam path. A rigid body may rigidly connect all of the beam directors in a fixed relationship so all of the beam directors experience common influences from anomalous external perturbations.

Another aspect of the invention involves a method of increasing the amplification factor beyond a value of four in an interferometric gravity characteristic measurement instrument. Vertically separated upper and lower test masses freefall simultaneously while a first light beam traverses a first beam path segment to impinge upon and reflect from a lower surface of the lower test mass and an upper surface of the upper test mass, and a second light beam traverses a second beam path segment to impinge upon and reflect from an upper surface of the lower test mass and a lower surface of the upper test mass. The first and second light beams traverse the first and second beam path segment multiple times, before the light beams are combined interferometrically to derive the gravity characteristic information.

Polarized first and second light beams preferably traverse the first and second beam path segments, and the polarized first and second light beams are rotated with each respective traversal of the first and second beam path segments, but the first and second differently polarized light beams occupy a coincident beam path except when in the first and second beam path segments.

A further aspect of the invention involves a method of determining a gradient of gravity, comprising freefalling upper and lower test masses simultaneously, directing first and second light beams having respectively different planes of polarization in a coincident beam path, diverting the first light beam from the coincident beam path into a first beam path segment to impinge upon and reflect from an upper surface of the upper test mass in freefall and a lower surface the lower test mass in freefall, diverting the second light beam from the coincident beam path into a second beam path segment to impinge upon and reflect from a lower surface of the upper test mass in freefall and an upper surface of the lower test mass in freefall, rejoining each diverted light beam with the other light beam in the coincident beam path after each light beam has traversed its respective beam path segment, combining the first and second light beams after each light beam has traversed its respective beam path segment, and determining the gradient of gravity from interference characteristics of the combined first and second light beams.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
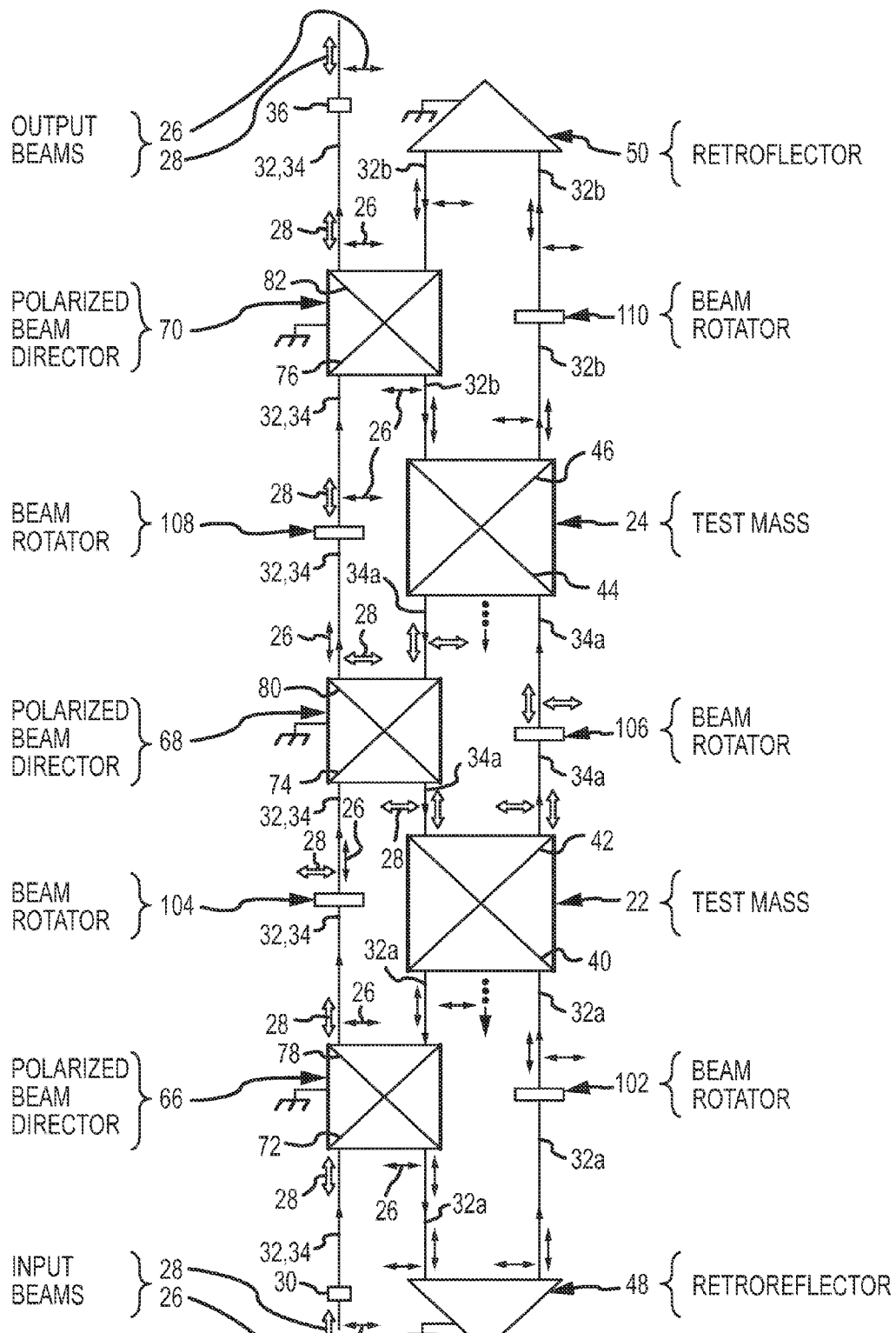
FIG. 1 is a schematic diagram of optical aspects of an interferometric gradiometer which embodies the present invention.

An interferometric gravity gradiometer 20 which measures a gradient of gravity is shown in FIG. 1. The measurement involves determining the relative difference in gravity experienced by two test masses 22 and 24 while simultaneously freefalling under the influence of gravity. The force of gravity acting on the lower test mass 22 is slightly greater than the force of gravity acting on the upper test mass 24, since the lower test mass 22 is closer to the center of the earth's mass.

The slightly greater gravity on the lower test mass 22 causes it to experience a slightly greater downward acceleration compared to the downward acceleration of the upper test mass 24, during simultaneous freefall. The slightly greater acceleration of the lower test mass 22 increases its downward velocity slightly more than the downward velocity of the upper test mass 24 increases, during simultaneous freefall. As a consequence, the lower test mass 22 moves a slightly greater distance downward compared to the downward movement of the upper test mass 24, during simultaneous freefall. The physical separation distance between the two test masses 22 and 24 at the end of their simultaneous freefall is slightly greater than the physical separation of the test masses 22 and 24 at the beginning of their simultaneous freefall. The change in physical separation of the test masses 22 and 24 at the end of their simultaneous freefall is measured and correlated to the difference of gravity experienced by the test masses 22 and 24.

Light beam interferometric techniques are used to measure the difference in physical separation of the test masses 22 and 24 and correlate to the difference in gravity. Two polarized light beams 26 and 28, which have mutually different planes of polarization, are used to measure the difference in physical separation of the test masses 22 and 24 at the end of their simultaneous freefall and to correlate to the difference in gravity. For purposes of illustration, the polarized light beam 26 is shown by a single-shafted double-headed arrow, and the polarized light beam 28 is shown by a double-shafted double-headed arrow. The heads and the shafts of the arrows illustrate the planes of the polarization of the light beams.

The two polarized light beams 26 and 28 are supplied to the gradiometer 20 at an input point 30. At the input point 30, the light beam 26 has an initial illustrative horizontal plane of polarization, and the light beam 28 has an initial illustrative vertical plane of polarization, as shown by the orientation of the shafts and heads of the arrows. Although a mutually perpendicular polarization of the two light beams 26 and 28 is preferred, a mutually different polarization of the light beams 26 and 28 will be satisfactory in the gradiometer 20, provided that the light beams contain sufficient energy. Because the light beams 26 and 28 have mutually different polarizations, each light beam 26 and 28 carries its own unique and distinguishable information which remains uninfluenced and not corrupted by the information of the other light beam, even when both light beams 26 and 28 are coincident and traverse the same beam path.

The polarized light beam 26 travels in a beam path 32, and the polarized light beam 28 travels in a beam path 34, to arrive at an output point 36 of the gradiometer 20. The light beams 26 and 28 and the beam paths 32 and 34 are coincident at all locations within the gradiometer 20 except where the light beams 26 and 28 are individually diverted from the coincident beam paths 32 and 34 into divergent beam path segments 32a, 32b and 34a. The light beam 26 in the beam path 32 separates from the light beam 28 in the beam path 34 in beam path segments 32a and 32b. Only the light beam 26, and not the light beam 28, traverses the beam path segments 32a and 32b. The light beam 28 in the beam path 34 separates from the light beam 26 in the beam path 32 in the beam path segment 34a. Only the light beam 28, and not the light beam 26, traverses the beam path segment 34a.

While in the beam path segments 32a and 32b, the light beam 26 impinges upon and reflects from a lower reflective surface of the lower test mass 22 and impinges upon and reflects from an upper reflective surface of the upper test mass 24. While in the beam path segment 34a, the light beam 28 impinges upon and reflects from an upper reflective surface of the lower test mass 22 and impinges upon and reflects from a lower reflective surface of the upper test mass 24. Because each light beam 26 and 28 reflects from the opposite upper and lower surfaces of each test mass, the increasing physical separation of the two test masses 22 and 24 during simultaneous freefall causes the relative lengths of the beam paths 32 and 34 to change oppositely with respect to one another. The cumulative length of the beam paths 34a and 34b reduces, because the greater acceleration of the lower test mass 22 reduces the length of the beam path segment 32a more than the slightly lesser acceleration of the upper test mass 24 increases the length of the beam path segment 32b. The cumulative length of the beam path 34a increases by the same amount, because the greater acceleration of the lower test mass compared to the slightly lesser acceleration of the upper test mass 24 slightly lengthens the distance between the two test masses 22 and 24.

The changed length of the beam paths 32 and 34 causes a changed relative phase relationship of the light beams 26 and 28 at the output point 36 after the two light beams 26 and 28 have traversed the entire beam paths 32 and 34, respectively. After traversing the entire beam paths 32 and 34, the polarized light beams 26 and 28 at the output point 36 are combined. The relatively changed phase relationship of the two combined beams 26 and 28 creates well known optical interference fringes. The interference fringes characterize the change in physical separation of the test masses during simultaneous freefall, and that change in physical separation is correlated to the gradient of gravity which becomes a measurement of the gradient of gravity. The techniques for optical interferometric measurement and correlation to a measurement of the gradient of gravity are well known.

Two conventional open faced corner cube retroreflectors 40 and 42 form the lower and upper reflective surfaces of the lower test mass 22 from which the light beams 26 and 28 reflect, respectively. The retroreflectors 40 and 42 face in opposite directions on the test mass 22. Two conventional open faced corner cube retroreflectors 44 and 46 form the lower and upper reflective surfaces of the upper test mass 24 from which the light beams 28 and 26 reflect, respectively. The retroreflectors 44 and 46 face in opposite directions on the test mass 24. The retroreflectors 42 and 46 face upward, and the retroreflectors 40 and 44 face downward, respectively. The downward facing retroreflectors 40 and 44 face in the same direction that the test masses 22 and 24 freefall, and the upward facing retroreflectors 42 and 46 face in the opposite direction that the test masses 22 and 24 freefall.

Conventional open faced corner cube retroreflectors 48 and 50 are stationarily positioned below and above the test masses 22 and 24, respectively. The lower retroreflector 48 faces upward in the direction of the lower test mass 22 to reflect the light beam 26 to the lower facing retroreflector 40 of the lower test mass 22. The upper retroreflector 50 faces downward in the direction of the upper test mass 24 to reflect the light beam 26 to the upper facing retroreflector 46 of the upper test mass 24.

Figure 2A:
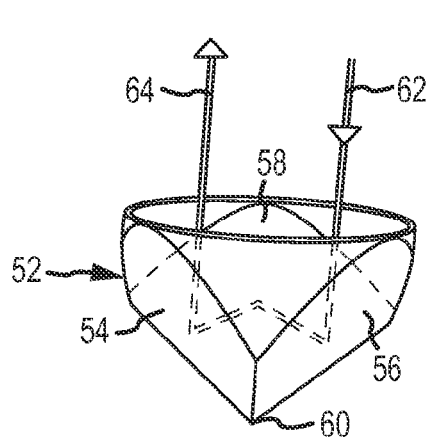
FIGS. 2A and 2B are different perspective generalized views of a single conventional open corner cube retroreflector used in the gradiometer shown in FIG. 1, also showing an incident light beam and a reflected light beam.
Figure 2B:
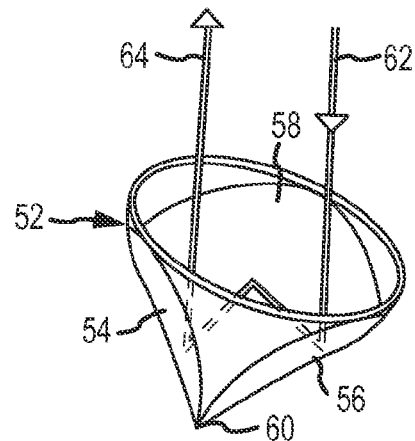

The corner cube retroreflectors 40, 42, 44, 46, 48 and 50 are each conventional optical elements. Characteristics of the retroreflectors 40, 42, 44, 46, 48 and 50 are represented in the single corner cube retroreflector 52 shown in FIGS. 2A and 2B. The retroreflector 52 has three mutually perpendicular walls 54, 56 and 58 which form a corner cube structure. The walls 54, 56 and 58 intersect one another perpendicularly and define a corner 60 which faces in the direction of light beam impingement. The walls 54, 56 and 58 are coated with a reflective material to cause light impinging on the walls 54, 56 and 58 to reflect from those walls. Alternatively, the walls 54, 56 and 58 may be formed of reflective mirror material, such as a polished metallic surface. The reflective walls 54, 56 and 58 are held in a connected and mutually perpendicular relationship by an adhesive or other structure (not shown) of the retroreflector 52.

The retroreflector 52 is an open retroreflector, because an incident light beam 62 passes through the ambient environment as it impinges upon and reflects off of the reflective walls 54, 56 and 58 and exits the retroreflector 52 as a reflected light beam 64. The mutually perpendicular angular relationship of the reflective walls 54, 56 and 58 creates an optical characteristic in which the reflected light beam 64 always reflects from the retroreflector 52 parallel to the incident light beam 62. This parallel relationship is maintained through a wide operative range of angles of the incident light beam 62. Unlike a mirror, the retroreflector 52 reflects light back in a direction parallel to the incident light.

Polarized beam directors 66, 68 and 70 are stationarily positioned between the test mass 22 and the retroreflector 48, between the test masses 22 and 24, and between the test mass 24 and the retroreflector 50, respectively, as shown in FIG. 1. The polarized beam directors 66, 68 and 70 each include a downward facing corner cube structure 72, 74 and 76 and an upward facing corner cube structure 78, 80 and 82, respectively. The corner cube structures 72, 78, and 74, 80, and 76, 82 of each respective polarized beam director 66, 68 and 70 face in respectively opposite directions.

Figure 3:
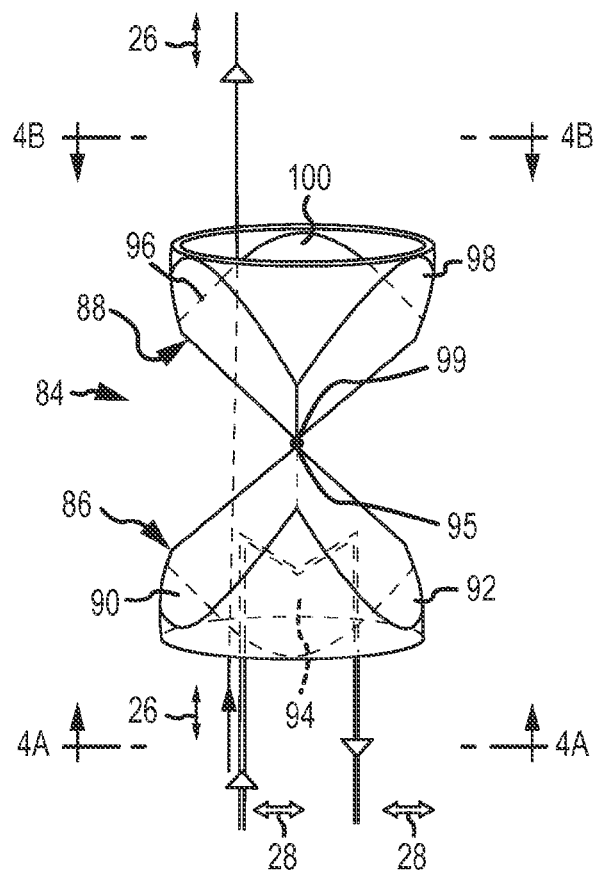
FIG. 3 is a perspective generalized view of a polarized beam director used in the gradiometer shown in FIG. 1.

Characteristics of each polarized beam director 66, 68 and 70 are represented in a single polarized beam director 84 shown in FIG. 3. The polarized beam director 84 includes two corner cube structures 86 and 88 which face in opposite directions with their optical axes coincident and parallel with one another. The corner cube structures 86 and 88 are held in position on the polarized beam director 84 by a retaining structure (not shown). The corner cube structure 86 has three mutually perpendicular walls 90, 92 and 94 which intersect one another at a common corner 95 and which are held in place by adhesive or other structure (not shown). The corner cube structure 88 also has three mutually perpendicular walls 96, 98 and 100 which intersect one another at a common corner 99 and which are held in place by adhesive or other structure (not shown). Preferably the corners 95 and 99 are coincident with each other, as shown. The first aforementioned US patent application describes more details of a polarized beam director.

Figure 4B:
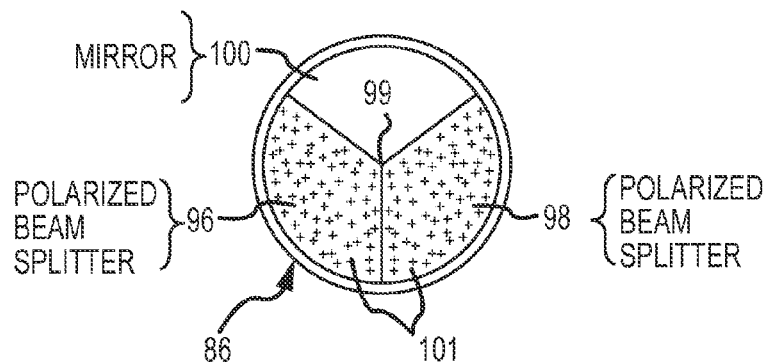
FIGS. 4A and 4B are cross-sectional views of portions of the polarized beam director shown in FIG. 3, respectively, taken substantially in the planes of lines 4A-4A and 4B-4B in FIG. 3, also illustrating thin film polarizers having polarizing characteristics.
Figure 4A:
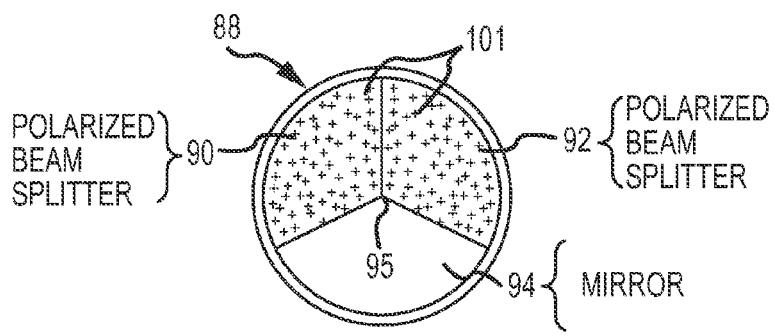

The walls 90 and 96, 92 and 98 and 94 and 100 are vertically offset and aligned with one another parallel to the coincident optical axes of the corner cube structures 86 and 88, as is understood from FIGS. 4A and 4B. The walls 90, 92, 94, 96, 98 and 100 of the corner cube structures 86 and 88 are formed from a plate or layer of optically transmissive material, such as glass. The walls 90, 92 and 96, 98 of the corner cube structures 86 and 88, respectively, are formed as polarized beam splitters. Each polarized beam splitter is formed by a conventional thin film polarizer 101 attached to the optically transparent material of each wall 90, 92 and 96, 98. The walls 94 and 100 of the corner cube structures 86 and 88, respectively, are formed as mirrors or optical reflectors. Each mirror or optical reflector is formed by a layer of conventional optically reflective material attached to the walls 94 and 100.

Each thin film polarizer 101 preferably constitutes a coating of conventional polarizing optical material on the walls 90, 92, 96 and 98. The coating of polarizing material is represented by hatching in FIGS. 4A and 4B. The coating of polarizing material of each thin film polarizer 101 achieves a light polarizing characteristic according to and in relation to the thickness of the coating, the angle of an incident beam impinging upon that coating, and the plane of polarization of the incident light beam. With the proper selection of the coating thickness, the angle of the incident beam and the plane of polarization of the incident beam, the coating of polarizing material has the effect of passing an incident polarized light beam which has a plane of polarization that is parallel to or aligned with the polarizing characteristics established by its thickness and the angle of incidence, while reflecting an incident polarized light beam with a perpendicular plane of polarization.

As a consequence of the vertically offset alignment of the corner cube walls 90, 96 and 92, 98 to which the thin film polarizers 101 have been attached, and the substantially identical angular orientation of the walls 90, 96 and 92, 98 relative to the aligned coincident optical axes of the corner cube structures 86 and 88, the thin film polarizers 101 pass polarized light beams through the walls 90, 92, 96 and 98 with a plane of polarization parallel to the established polarizing characteristics. A polarized light beam passing through one of the walls 90 or 92 will intersect the vertically aligned wall 96 and 98 at the same angle of incidence on the wall 90 or 92, and will thereby pass through that wall in the same manner that it passed through the first wall, provided that the thin film polarizer coating on both walls is approximately the same thickness. The polarized beam director 84 therefore acts as an optically transparent window or optical conductor to an incident light beam having a plane of polarization aligned with the polarizing characteristics of the thin film polarizers 101, thereby directing that light beam through the polarized beam director 84 without diversion. For example, as understood from FIGS. 3, 4A and 4B, the light beam 26 passes directly through the aligned beam splitter walls 90 and 96.

On the other hand, an incident light beam having a non-aligned plane of polarization which is substantially perpendicular polarizing characteristics of the thin film polarizers 101 is reflected from the thin film polarizers 101 as though they were reflectors or mirrors. In this circumstance, the incident light beam having the non-aligned plane of polarization perpendicular to the polarizing characteristics of the thin film polarizers 101 is reflected from the walls 90, 92 and 94 of the corner cube structure 86, in the same manner as a retroreflector. Similar reflection from the walls 96, 98 and 100 of the corner cube structure 88 occurs with respect to an incident light beam having the non-aligned plane of polarization perpendicular to the polarizing characteristics of the thin film polarizers 101 on the walls 96 and 98. The reflected light beam exits from each corner cube structure 86 and 88 in a direction parallel to the incident light beam, just as in a conventional retroreflector. For example, as shown in FIG. 3, the light beam 28 reflects from the beam splitting walls 90 and 92 onto the mirror wall 94 (FIG. 4A), and then passes away from the polarized beam splitter 20 along the diverted beam path 28.

When incident light beam having a non-aligned plane of polarization is reflected from the thin film polarizer 101 on a first one of the walls of one corner cube structure 86 and 88, for example walls 90 or 96, the reflected beam intersects the other two walls 92, 94 or 98, 100 of that corner cube structure 86 and 88 at a changed angle of incidence. In order to preserve the polarization of that reflected light beam, the thickness of the thin film polarizer on the other one of the walls 92 or 98 can be adjusted to continue the reflection to the wall 94 or 100 of that corner cube structure and to prevent that reflected beam from becoming polarized or losing a substantial amount of energy due to polarization in a different plane.

As an alternative to adjusting the thickness of the thin film polarizer on the other one of the walls, as discussed in the preceding paragraph, a conventional beam rotator could be located in the space within the three mutually perpendicular walls 90, 92, 94 and 96, 98, 100 of the corner cube structures 86 and 88, to establish the appropriate orientation of the reflected beam so that it continues to reflect. A further alternative is to use a graded optical plate in place of each of the thin film polarizers 101, and adjust the angles of the graded optical plate to pass a polarized light beam having one plane of polarization while reflecting a polarized beam having a perpendicular plane of polarization. The concern about maintaining or not substantially adversely affecting the plane of polarization of the reflected beam is one of maintaining sufficient energy in the reflected beam. So long as there is sufficient energy in the reflected beam, it may be unnecessary to adjust the coating thickness of the other thin film polarizer, use a beam rotator, or use a graded optical plate.

The functional characteristics of the polarized beam directors 66, 68 and 70 are shown in FIG. 1. The light beam 26 or 28 of the aligned polarization passes completely through each polarized beam director 66, 68 and 70, as though the polarized beam director was optically transparent, but the light beam 26 or 28 of the other mutually perpendicular polarization is reflected from the polarized beam directors 66, 68 and 70 in the same manner as a conventional retroreflector. Consequently, each polarized beam director 66, 68 and 70 diverts or redirects one polarized incident light beam 26 or 28 from the coincident beam paths 32 and 34 into the beam path segments 32a, 34a and 32b, respectively, while passing the other polarized incident light beam 26 or 28 in the coincident beam path without diversion or redirection.

Beam rotators 102, 104, 106, 108 and 110 are stationarily positioned respectively between the test mass 22 and the retroreflector 76, between the polarized beam directors 66 and 68, between the test masses 22 and 24, between the polarized beam directors 68 and 70, and between the test mass 24 and the retroreflector 50. Each beam rotator 102, 104, 106, 108 and 110 rotates the plane of polarization of an impinging polarized light beam by 90° as that light beam passes through the beam rotator. Rotation of the polarized light beam occurs regardless of the plane of polarization. The output light beam is therefore rotated 90° relative to the input light beam, as a consequence of having passed through each beam rotator 102, 104, 106, 108 and 110.

The beam rotators 102, 104, 106, 108 and 110 are conventional half wavelength plate optical elements. Half wavelength plates are called retarder plates or optical filters. They are made from bi-refringent material which achieves light rotating characteristics from and depending upon the thickness of the bi-refringent material. The thickness of the bi-refrigerant material determines the degree of rotation.

The optical functionality of the gradiometer 20 shown in FIG. 1 is as follows. In response to the two mutually perpendicularly polarized light beams 26 and 28 supplied at the input point 30, the beam splitting walls of the polarized beam director 66 pass the vertically polarized (as shown) light beam 28 into the coincident beam paths 32 and 34. The corner cube structure 72, acting as a retroreflector, reflects or diverts the horizontally polarized (as shown) light beam 26 into the beam path segment 32a. The light beam 26 is reflected from the corner cube structure 72 to the retroreflector 48. The retroreflector 48 then reflects the light beam 26 to the beam rotator 102, which rotates the plane of polarization from the horizontal (as shown) to the vertical (as shown). The vertically polarized light beam 26 is then reflected from the lower facing retroreflector 40 of the lower test mass 22 to the upward facing corner cube structure 78 of the polarized beam director 66. Because the polarized light beam 26 was rotated by the beam rotator 102 to the vertical polarization, the light beam 26 passes through the corner cube structures 78 and 72 of the polarized beam director 66, just as the vertically polarized (as shown) light beam 28 passes through the polarized beam director 66. As the vertically polarized (as shown) light beam 26 passes through the polarized beam director 66, the light beam 26 completes a first traversal of the beam path segment 32a and commences a second traversal the beam path segment 32a.

The arrows showing the polarization plane of the light beam 26 during the first traversal of the beam path segment 32a are shown on the left hand side of the lines defining the beam path segment 32a. The arrows showing the polarization plane of the light beam 26 during the second traversal of the beam path segment 32a are shown on the right-hand side of the lines defining the beam path segment 32a. This same convention of using arrows on the right hand and left hand sides of the lines defining the beam path segments to show the polarization planes of the light beams in the first and second traversals of those beam path segments, also applies with respect to the light beams 28 and 26 traversing the beam path segments 34a and 32b, respectively.

The light beam 26 commences a second traversal of the beam path segment 32a with a vertical polarization (as shown), after passing through the polarized beam director 66. The vertically polarized light beam 26 passes through the polarized beam director 66 and impinges on and reflects off of the retroreflector 48 and then passes through the beam rotator 102. The beam rotator 102 rotates the plane of polarization of the light beam 26 from vertical to horizontal (as shown). The horizontally polarized light beam then reflects from the lower retroreflector 40 of the test mass 22 and impinges on the upper corner cube structure 78 of the polarized beam director 66.

Because of the horizontal polarization (as shown) of light beam 26 at the end of the second traversal of the beam path segment 32a, the beam splitter and mirror walls of the upper corner cube structure 78 reflect the horizontally polarized light beam 26. The horizontally polarized light beam 26 rejoins the beam path 32 which is coincident with the other vertically polarized light beam 28 in the beam path 34. Upon rejoining the coincident beam paths 32 and 34 from the beam path segment 32a, the light beam 26 has a mutually perpendicular polarization to the light beam 28 in the coincident beam path 34.

The two light beams 26 and 28 traverse the same coincident beam path 32 and 34 from the upper corner cube structure 78 of the polarized beam director 66 through the beam rotator 104 to the lower corner cube structure 74 of the polarized beam director 68. The polarization planes of both light beams 26 and 28 are rotated 90° when the light beams pass through the beam rotator 104. The light beam 26 assumes a vertical polarization (as shown) and passes through the aligned polarizing characteristics of the polarized beam splitting walls of the corner cube structures 74 and 80 of the polarized beam director 68 in the beam path 32, as though the corner cube structures 74 and 80 were optically transparent. The light beam 28, which now has a horizontal polarization (as shown) and is therefore perpendicular to the polarizing characteristics of the two beam splitting walls, reflects from the two polarized beam splitting and mirror walls of the lower corner cube structure 74 of the polarized beam director 68, as though the corner cube structure 74 was a retroreflector.

The polarized beam director 68 diverts the light beam 28 into the beam path segment 34a at the downward facing corner cube structure 74. The light beam 28 is reflected from the upward facing retroreflector 42 of the lower test mass 22. The light beam 28 then passes through the beam rotator 106, which rotates the plane of polarization from horizontal (as shown) to vertical (as shown). The vertically polarized light beam 28 is then reflected from the lower facing retroreflector 44 of the upper test mass 24 to the upward facing corner cube structure 80 of the polarized beam director 66. Because the beam 28 was rotated by the beam rotator 106 to a vertical polarization, which is parallel to the polarizing characteristics of the two beam splitting walls of the corner cube structure 80 the light beam 28 passes through the polarized beam director 68, as though it was optically transparent. As the light beam 28 with the vertical polarization (as shown) passes through the polarized beam director 68, the light beam 28 completes a first traversal of the beam path segment 34a and commences a second traversal of the beam path segment 34a.

The light beam 28 commences a second traversal of the beam path segment 34a with a vertical polarization (as shown), after passing through the polarized beam director 66. The vertically polarized light beam 28 passes through the polarized beam director 68 and impinges on and reflects off of the upward facing retroreflector 42 of the lower test mass 22 and then passes through the beam rotator 106. Upon passing through the beam rotator 106, the plane of polarization light beam 28 is rotated from vertical (as shown) to horizontal (as shown). The light beam 28 then reflects from the lower retroreflector 44 of the upper test mass 24 and impinges on the upper corner cube structure 80 of the polarized beam director 68.

Because of the horizontal polarization (as shown) of light beam 28 at the end of the second traversal of the beam path segment 34a, which is perpendicular to the polarizing characteristics of polarized beam splitter walls of the upper corner cube structure 80, the horizontally polarized light beam 28 is reflected back into the beam path 34 which is coincident path with the vertically polarized light beam 26 in the beam path 32. Upon rejoining to the coincident beam paths 32 and 34 from the beam path segment 34a, the light beam 28 has a mutually perpendicular polarization to the light beam 26 in the coincident beam path 32.

The two light beams 26 and 28 traverse the same coincident beam path 32 and 34 from the upper corner cube structure 80 of the polarized beam director 68 through the beam rotator 108 to the lower corner cube structure 76 of the polarized beam director 70. The polarization planes of both light beams 26 and 28 are rotated 90° when the light beams pass through the beam rotator 108. The light beam 28 assumes a vertical polarization (as shown) in alignment with the polarizing characteristics of the polarized beam splitting walls of the corner cube structures 76 and 82 of the polarized beam director 70, and passes completely through the polarized beam director as though it was optically transparent. The light beam 26, which now has a horizontal polarization (as shown) that is perpendicular to the polarizing characteristics of the two polarized beam splitting walls of the lower corner cube structure 76 of the polarized beam director 70, is reflected as though the lower corner cube structure was a retroreflector.

The polarized beam director 70 diverts the light beam 26 into the beam path segment 32b at the downward facing corner cube structure 76. The horizontally polarized (as shown) light beam 26 passes to the upward facing retroreflector 46 of the upper test mass 24 where it is reflected to the beam rotator 110. The beam rotator 110 rotates plane of polarization of the light beam 26 from horizontal (as shown) to vertical (as shown). The vertically polarized light beam 26 is then reflected from the downward facing retroreflector 50 to the upward facing corner cube structure 82 of the polarized beam director 70. Because the beam 26 was rotated by the beam rotator 110 to the vertical polarization, which aligns its plane of polarization with the polarizing characteristics of the polarized beam splitting walls of the corner cube structures 82 and 76, the light beam passes through the corner cube structures 82 and 76 of the polarized beam director 70, just as the vertically polarized (as shown) light beam 28 passes through the polarized beam director 70. As the light beam 26 with a vertical polarization (as shown) passes through the polarized beam director 70, the light beam 26 completes a first traversal of the beam path segment 32b and commences a second traversal of the beam path segment 32b.

The light beam 26 commences a second traversal of the beam path segment 32b with a vertical polarization (as shown), after passing through the polarized beam director 70. The vertically polarized light beam 26 leaves the polarized beam director 70 and impinges on and reflects off of the upward facing retroreflector 46 of the upper test mass 24 and then passes through the beam rotator 110. The beam rotator 110 rotates by 90° the plane of polarization of the light beam 26 from the vertical (as shown) to the horizontal (as shown). The horizontally polarized (as shown) light beam 26 then reflects from the retroreflector 50 and impinges on the upper corner cube structure 82 of the polarized beam director 66.

Because of the horizontal polarization (as shown) of light beam 26 at the end of the second traversal of the beam path segment 32b, which is perpendicular to the polarizing characteristics of the polarized beam splitter walls of the upper corner cube structure 78, the horizontally polarized light beam 26 is reflected back into the beam path 32 which is coincident with the vertically polarized light beam 28 traversing the beam path 34. Upon rejoining the coincident beam path 32 and 34 from the beam path segment 32b, the light beam 26 has a mutually perpendicular polarization to the light beam 28 in the beam path 34.

The two light beams 26 and 28 traverse the same coincident beam path 32 and 34 from the upper corner cube structure 82 of the polarized beam director 70 to the beam output point 36. At the beam output point 36, both light beams 26 and 28 have a mutually perpendicular polarization with respect to one another. At each point where the beam paths 32 and 34 are coincident, the light beams 26 and 28 occupy a mutually perpendicular polarization relationship.

The slightly different affects of gravity on the test masses 22 and 24 during their simultaneous freefall change the lengths of the beam paths 32 and 34 in respectively opposite directions. The beam path 32 becomes shorter, and the beam path 34 becomes longer. The relative change in the optical lengths of the beam paths 32 and 34 is eight times the amount of relative physical change in separation of the test masses 22 and 24 during simultaneous freefall. This change factor of eight, which is referred to as amplification, facilitates recognition and measurement of the fringes, thereby permitting more accurate calculations of the gradient of gravity. The amplification factor of eight relative to the amount of the change in separation distance of the test masses 22 and 24 is demonstrated by the following mathematical derivation.

When the lower test mass 22 falls a distance $Z_L$, the beam path segment 32a is shortened by a physical distance equal to $2Z_L$, because the downward movement of the test mass 22 physically shortens each of two vertical parts of the beam path segment 32a by the amount $Z_L$. Each of the two vertical parts of the beam path segment 32a is the distance between the downward facing retroreflector 40 of the lower test mass 22 and the upward facing stationary retroreflector 48. One vertical part extends through the beam rotator 102 and the other vertical part interacts with the polarized beam director 66.

However, because the light beam 26 traverses the beam path segment 32a two times, the optical length change of the beam path segment 32a is equal to $4Z_L$, or two times (one for each an optical traversal) the physical path length change $2Z_L$. Thus, when the lower test mass 22 moves downward by the amount $Z_L$, the overall optical length of the beam path segment 32a decreases by the distance $4Z_L$.

A similar but opposite situation occurs with respect to the upper test mass 24, except that the optical path length of the divergent beam path segment 32b lengthens. When the upper test mass 24 falls a distance of $Z_u$, the beam path segment 32b is physically lengthened by a distance of $2Z_u$, because the downward movement of the test mass 24 lengthens each of the vertical parts of the beam path segment 32b by the amount $Z_u$. Each of the two vertical parts of the beam path segment 32b is the distance between the upward facing retroreflector 46 of the upper test mass 24 and the downward facing stationary retroreflector 50. One vertical part extends through the beam rotator 110 and the other vertical part interacts with the polarized beam director 70. Because the light beam 26 traverses the beam path segment 32b two times, the optical length change of the beam path segment 32b is equal to $4Z_U$, or two times (one for each an optical traversal) the physical path change $2Z_U$. Thus, when the upper test mass 24 moves downward by the amount $Z_U$, the overall optical length of the beam path segment 32b increases by the distance $4Z_U$.

The total change in the beam path 32 is equal to the change in the length of the beam path segment 32b less the change in the length of the beam path segment 32a. That changed amount, referred to as $\Delta BP_{32}$ is equal to $4Z_U - 4Z_L$, or $4(Z_U - 4Z_L)$. The change in the total length of the beam path 32, $\Delta BP_{32}$, is a negative number, indicating that the length of the beam path 32 has shortened. The length of the beam path 32 decreases because the beam path segment 32a decreases in length more than the beam path segment 32b increases in length, due to the fact that the greater gravity on the lower test mass 22 causes it to fall a greater distance than the lesser gravity on the upper test mass 24 causes it to fall.

The changing length of the beam path 34 occurs only in the divergent beam path segment 34a. When the lower test mass 22 falls a distance $Z_L$, the beam path segment 34a is lengthened by a physical distance equal to $2Z_L$, because the downward movement of the test mass 22 physically lengthens each of two vertical parts of the beam path segment 34a by the amount $Z_L$. When the upper test mass 24 falls a distance of $Z_u$, the beam path segment 34a is physically shortened by a distance of $2Z_u$, because the downward movement of the test mass 24 shortens each of the same two vertical parts of the beam path segment 34a by the amount $Z_u$. Each of the two vertical parts of the beam path segment 34a is the distance between the upward facing retroreflector 42 of the lower test mass 22 and the downward facing retroreflector 44 of the upper test mass 24. One vertical part extends through the beam rotator 106 and the other vertical part interacts with the polarized beam director 68.

The total change in the beam path segment 34a is equal to the change in the length caused by the movement of the test masses 22 and 24. The greater gravity on the lower test mass 22 has the effect of physically lengthening the beam path segment 34a by the physical amount $2Z_L$. The lesser gravity on the upper test mass 24 has the effect of physically shortening the beam path segment 34a by the physical amount $2Z_U$. The total physical change in the beam path segment 34a is therefore $2Z_L - 2Z_U$. Because the light beam 28 traverses the beam path segment 34a two times, the optical length change of the beam path segment 34a is equal to $2(2Z_L - 2Z_U)$, or $4(Z_L-Z_U)$, which is two times (one for each an optical traversal) the physical path change $2Z_L-2Z_U$.

The changed amount of the beam path 34, referred to as $\Delta BP_{34}$, is equal to $4Z_L-4Z_U$, or $4(Z_L-Z_U)$. The change in the total length of the beam path 34, $\Delta BP_{34}$, is a positive number, indicating that the length of the beam path 34 has lengthened. The length of the beam path 34 increases due to the fact that the greater gravity on the lower test mass 22 causes it to fall a greater distance than the lesser gravity on the upper test mass 24 causes it to fall.

When light beams 26 and 28 from the two changed-length beam paths 32 and 34 are combined to determine the gradient of gravity, the combined output light beam contains an interference fringe signal whose phase is given by the difference in path length of the two beam paths 32 and 34. That difference in optical path length of the two beam paths 32 and 34, referred to as $\Delta L$, is equal to the difference in change in length of the two individual beam paths 34 and 32, i.e. $\Delta BP_{34}$ and $\Delta BP_{32}$, respectively. Stated mathematically, $\Delta L=\Delta BP_{34}-\Delta BP_{32}$, or $\Delta L=4(Z_L-Z_U)-4(Z_U-Z_L)$, or $\Delta L=8(Z_L-Z_U)$.

Figure 5:
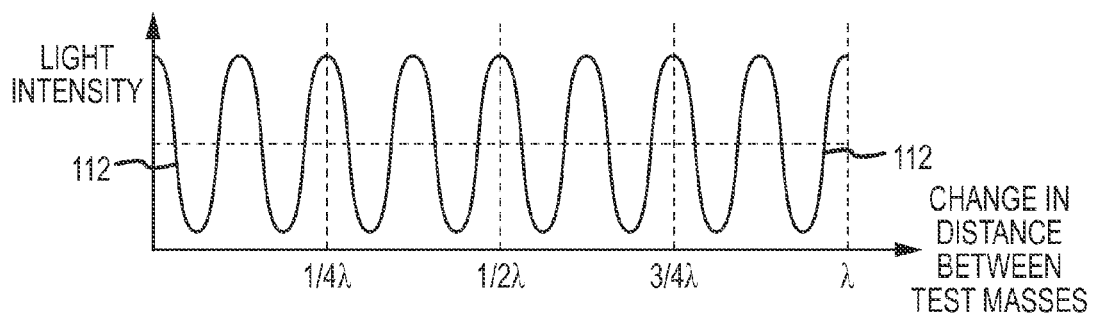
FIG. 5 is a generalized illustration of interference fringes which occur during simultaneous freefall of test masses of the gradiometer shown in FIG. 1.

This mathematical development shows that the gradiometer 20 produces an interference fringe signal that has a phase change equal to 8 times the relative difference in the physical free-fall distances of the two freely falling test masses. This relationship is shown in FIG. 5, where eight interference fringes 112 occur for each relative change in distance between the two test masses equal to one wavelength ($\lambda$) of the input light beams 26 and 28 (FIG. 1).

The relationship of the number of fringes 112 relative to the change in the light beam path lengths of one wavelength is also a statement of the amplification factor. A greater the amplification factor yields a greater accuracy in measurement.

The amplification effect from the gradiometer 20 can also be understood generally in terms of a differential frequency shift of the light beams 26 and 28 in each of the beam paths 32 and 34 due to the well-known Doppler effect. The relative Doppler shift of light for a moving observer is given by the equation $f=f_o \{(1+v/c)/[(1-(v/c)^2]^{1/2}\}$, where $f_o$ is the frequency of light in the rest frame of reference and f is the frequency in the moving frame of reference, v is a velocity of the moving observer, and c is the speed of light. For velocities that are much smaller than the speed of light, which is the case with respect to the freefalling test masses 22 and 24, a first-order approximation is sufficient, so that $f \cong f_o (1+v/c)$. The change in the frequency, $\Delta f=f-f_o$, therefore is proportional to the ratio of the velocity of the observer to the speed of light or $\Delta f=v/c\, f_o$.

The Doppler shift of a light beam reflecting from a moving mirror is twice this value or $\Delta f=2\, v/c\, f_o$. This can be understood because the moving mirror "sees" a Doppler shifted beam and then emits a new frequency upon reflection. The new emitted frequency is also Doppler shifted in the same manner when observed by the stationary observer, which in the case of the gradiometer 20, is any nonmoving portion of it. Each light beam 26 and 28 therefore experiences a Doppler shift which is related to twice the velocity of the moving test masses 22 and 24 from which the light beam reflects.

Each downward freefalling test mass shifts the downward reflected light beam higher in frequency when the light beam reflects from the lower facing retroreflector of that test mass. Each upward reflected light beam is shifted lower in frequency when the light beam reflects from the upward facing retroreflector of the downward freefalling test mass. The light beam in each beam path reflects off of the downward facing retroreflector of one freefalling test mass and the upward facing retroreflector of the other freefalling test mass with the net effect of giving an overall Doppler frequency shift proportional to twice the difference in the velocities of the two falling test masses. The light beam in the other beam path is Doppler frequency shifted in the other direction.

Because the light beams 26 and 28 traverse each beam path segment 32a, 32b and 34a two times, the frequency shift effect in the light beams 32 and 34 is multiplied by two (one for each an optical traversal). The result is a frequency shift in each separate beam path segment equal to four times the relative difference in the velocities of the two freefalling test masses. The frequency shift of the light beam 26 in the beam path segments 32a and 32b is to a higher frequency, compared to the frequency of the input light beams 26 and 28, because the beam path segment 32a decreases in length more than the beam path segment 32b increases in length. The net effect on the frequency of the light beam 26 is an increase in frequency to a value of four times the change in relative separation distance of the two freefalling test masses 22 and 24 at the end of simultaneous freefall. The same situation exists with respect to the light beam 28 in the beam path segment 34a, except that its output frequency is decreased to a value of four times the increase in separation distance of the two test masses 22 and 24 during simultaneous freefall.

When the output light beams 26 and 28 are combined, a signal is created with a frequency given by the difference of the frequency of the light beams 26 and 28 in the beam paths 32 and 34. That difference is equal to the cumulative effect of the four times the oppositely Doppler frequency shifted light beams 26 and 28, with the resulting signal in the recombined output light beam given by a Doppler frequency shift proportional to eight times the differential velocity of the two falling test masses at the end of simultaneous freefall. This amplification factor of eight is the same as the amplification factor of eight derived above from consideration of the changes in optical path length of the two beam paths 32 and 34.

In addition to the amplification factor of eight, another significant aspect of the gradiometer 20 is an improved capability for common mode rejection of the effects of random, unintended, spurious and aberrant influences from perturbations and vibrations caused by an external environmental effects.

Improved common mode rejection capability results from conducting the light beams 26 and 28 through the coincident matched beam paths 32 and 34. Because both beam beams 26 and 28 in both beam paths 32 and 34 are coincident, any effect from aberrant influences affects both beams 26 and 28 equally. This equal effect then cancels the common mode rejection when the two beams 26 and 28 are combined.

Figure 6:
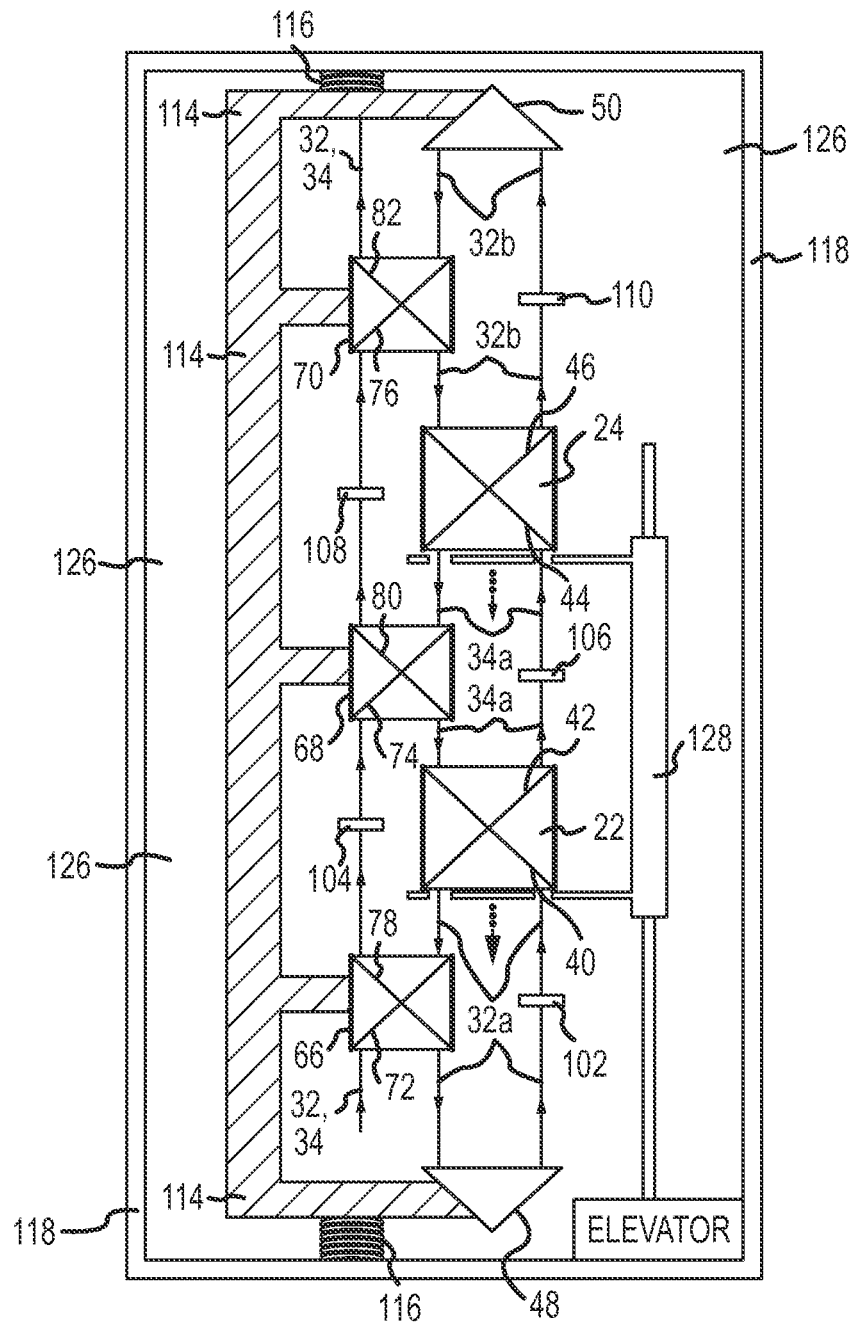
FIG. 6 is a diagram of the gradiometer shown in FIG. 1, with additional operative components.

Enhanced common mode rejection capability results from attaching the stationary polarized beam directors 66, 68 and 70 and the stationary retroreflectors 48 and 50 to a single super rigid body 114, as shown in FIG. 6. The rigid body 114 is attached by shock mounts 116 to a housing 118 of the gradiometer 20. The shock mounts 116 isolate the rigid body 114 and the components 48, 50, 66, 68 and 70 from the effects of external aberrant influences transmitted to the housing 118, thereby isolating the optical components 48, 50, 66, 68 and 70 and the light beams 26 and 28 from those adverse influences.

To the extent that any external aberrant influences are transmitted through the housing 118 to rigid body 114, the rigid body 114 rigidly holds the components 48, 50, 66, 68 and 70 in a single fixed relative relationship among themselves and causes any aberrant perturbations to equally affect the components 48, 50, 66, 68 and 70. Any effect from aberrant perturbations on one or more of the polarized beam directors 66, 68 and 70 equally affects both light beams 26 and 28, since both light beams 26 and 28 occupy coincident paths through those components 66, 68 and 70. The aberrant effects on the two coincident light beams 26 and 28 are canceled by common mode rejection when those light beams 26 and 28 are combined.

The rigid body 114 also transmits any aberrant influences on the retroreflectors 48 and 50 equally to the light beam 26 traversing the beam path segments 32a and 32b. As described above, the effects on the light beam 26 traversing the beam path segment 32a is subtracted from the effects on the light beam 26 in traversing the beam path segment 32b. The subtraction eliminates any adverse influence from the retroreflectors 48 and 50 on the light beam 26 by common mode rejection, since each retroreflector 48 and 50 experiences the same adverse influences due to their connections to the rigid body 114.

Common mode rejection of adverse influences on the light beams 26 and 28 arising from tilting or rotation of the test masses 22 and 24 is achieved by the characteristics of the test masses 22 and 24. The characteristics of both test masses 22 and 24 are the same, and those characteristics are illustrated by the test mass 24 shown in FIG. 7. The upper test mass 24 is shown rotated clockwise, as might arise from random rotation while freefalling due to anomalous perturbations or vibrations of the housing 118 at the instant when the test mass 24 is released to freefall. Such random perturbations may rotate both test masses 22 and 24 in the same or respectively different directions, or rotate one test mass but not the other, or rotate one test mass to a different relative degree than the other test mass is rotated.

Figure 7:
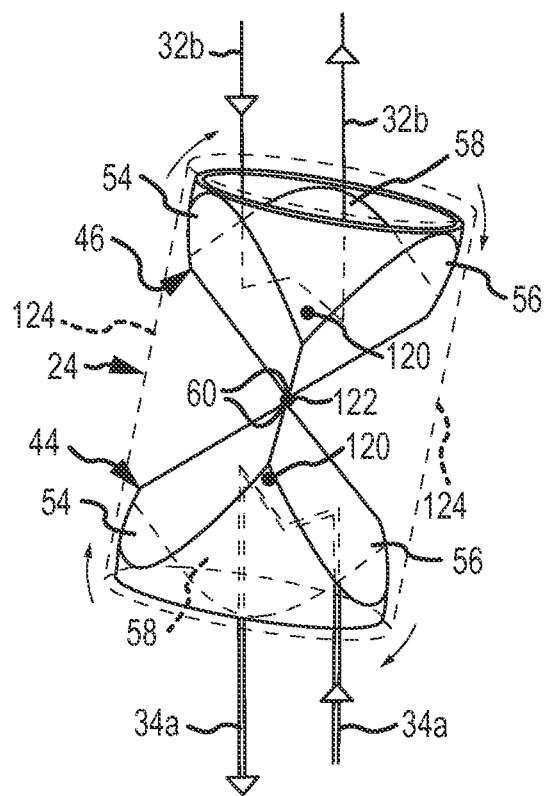
FIG. 7 is a perspective schematic view of an upper test mass of the gradiometer shown in FIG. 1, illustrated in a tilted or rotated position during freefall.

The characteristics of the retroreflectors 44 and 46 of the test mass 24 have been generally described in connection with FIG. 2. Additional characteristics are shown in FIG. 7 and are described in U.S. patent application Ser. No. 13/564,548, identified above. Each of the retroreflectors 44 and 46 has an optical center point 120 which is equidistant from each of the reflective walls 54, 56 and 58. When a retroreflector is rotated about its optical center point 120, the path length of the light beam which impinges upon and reflects from the retroreflector remains constant. When the retroreflector is rotated about a point other than its optical center point 120, the length of the light path changes in length, and that change is related to the amount of angular rotation about a rotational point which is not coincident with the optical center point 120. For similar changes in angular rotation about points which have the same relative relationship to the optical center point 120, the increase in the path length is the same.

The retroreflectors 44 and 46 are positioned on the test mass 24 facing in opposite directions and parallel with one another. The optical center points 120 of the retroreflectors 44 and 46 are located equidistant from a center of mass point 122 of the test mass 24. The two optical center points 120 and the center of mass point 122 are located co-linearly. The corners 60 of the retroreflectors 44 and 46 where the reflective walls 54, 56 and 58 of each retroreflector contact one another are also located coincident with the co-linear relationship of the two optical center points 120. With these characteristics, both the incident and reflected light beams 32a and 34a extend parallel to one another.

The test mass 22 has a physical structure 124 which holds the two retroreflectors 44 and 46 in place on the test mass 24 to create these described relationships. The physical structure 124 of the test mass 24 and the two retroreflectors 44 and 46 is balanced so that the center of mass point 122 is located midway between the two optical center points 120 and coincident with the linear relationship of the two optical center points 120. In this configuration, the distance from the center of mass point 122 to the optical center point 120 of the retroreflector 44 is equal to the distance from the center of mass point 122 to the optical center point 120 of the retroreflector 46.

Any rotation or tilting of the test mass 24 during freefall naturally occur at the center of mass point 122. Locating the center of mass point 122 of the test mass 24 as described causes the optical center points 120 of both retroreflectors 44 and 46 to rotate in the same amount and in the same direction relative to the center of mass point 122. This similar rotation in the same direction causes the light beams which impinge on the retroreflectors 44 and 46 to be changed equally in their lengths.

When the test mass 22 rotates to a degree different from the rotation of the test mass 24 (FIG. 1), a net change in the lengths of the light beams 26 and 28 in the beam path segments 32a, 32b and 34a may occur. However those changes in the lengths of the light beams 26 and 28 will be the same amount, because each of the two retroreflectors 40, 42 and 44, 46 of the test masses 22 and 24 will rotate the same amount relative to the center of mass 22 of each test mass. For example, rotation of the lower test mass 22 may change the length of the beam path segments 32a and 34a, and rotation of the upper test mass 24 may change the length of the beam path segments 32b and 34a, but the amount of change created by the rotation of each test mass changes beam path 32 and 34 by the same amount. Upon combination of the light beams 26 and 28 at the output point 36, this change will be canceled. Consequently, rotation of the test masses 22 and 24 does not adversely affect the relative lengths of the beam paths 32 and 34, because the degree of rotation by one or both of the test masses 22 and 24 has the same effect on the lengths of both beam path segments 32a, 32b and 34a. This form of common mode rejection further improves the accuracy of measurement, by eliminating the adverse effects on the path lengths from rotation of the test masses during freefall.

Another improvement in measurement accuracy arises from parallel light beam paths. Parallel light beam paths results from the use of corner cube structures and retroreflectors to direct the reflected light beam in a path parallel to the incident light beam. This parallel reflection characteristics causes the light beams in each of the beam path segments 32a, 32b and 34a to remain parallel to one another in those beam path segments 32 and 34, as the light beams 26 and 28 traverse those beam paths. The polarized beam directors 66, 68 and 70 reflect the diverted light beams into each of the beam path segments in a direction parallel to the other light beam which remains in the coincident beam path, and to reflect the light beam in the beam path segments back into the coincident beam path to rejoin the other light beam which remained in the coincident beam path.

If the beam paths 32 and 34 were not coincident or parallel with one another throughout the gradiometer, any non-parallel deviation of any aspect of either beam path 32 and 34 would cause that deviated beam path to have a different length compared to the other beam path. Such a difference in path length would cause the light beam in the deviated beam path to travel a different distance than the light beam travels in the other, non-deviated beam path, resulting in relative phase changes between the light beams 26 and 28. The phase shifts resulting from unequal beam path lengths would create erroneous interference fringes that would lead to errors or inaccuracies in determining the gradient of gravity or other characteristic of gravity being measured.

The use of the retroreflectors 40, 42, 44, 46 and 48 and the corner cube structures 72, 74, 76, 78, 80 and 82, to change the direction of the light beams 26 and 28, ensures parallelism in the beam paths 32 and 34, thereby maintaining equal path lengths. Fixing the position of the retroreflectors 48 and 50 and the corner cube structures 72, 74, 76, 78, 80 and 82 becomes less critical when assembling the gradiometer 20, because these corner cube structures and retroreflectors create the parallelism in the light beams 26 and 28 even though the angular orientation of each retroreflector may not be precisely exact. The positions of the retroreflectors 40, 42, 44 and 46 on the test masses 22 and 24 are more critical, however, to assure that the optical center points 120 and the center of mass point 24 are collinear, and that the optical center points 120 are equidistant from the center of mass point 24 (FIGS. 5 and 6). Of course, the positions of the retroreflectors 40, 42, 44 and 46 on the test masses 22 and 24, and the positions of the corner cube structures 72, 74, 76, 78, 80 and 82 on the polarized beam directors 66, 68 and 70, pass and reflect the incident and reflected light beams parallel to one another.

Another beneficial aspect of the gradiometer 20 is that second order optical effects are canceled by passing the light beams 26 and 28 through the beam path segments 32*a*, 32*b* and 34*a* two times. Second order effects occur because the speed of light changes as the beam passes through a medium, due to Snell's law. Such second-order effects introduce measurement errors, due to the change in the speed of light. However, the second order effects are canceled when the light beams 26 and 28 in the diverted beam path segments 32*a*, 32*b* and 34*a* each pass through the polarized beam directors 66, 68 and 70 when transitioning from the first transition of the diverted beam path to the second traversal of the diverted beam path.

As shown in FIG. 6, the gradiometer 20 includes a vacuum chamber 126 which is part of the housing 118 of the gradiometer 20. The test masses 22 and 24 freefall within the vacuum chamber 126. Achieving as close to a perfect vacuum as is practically possible within the vacuum chamber 126 eliminates most of the gas within the chamber, thereby reducing or eliminating as much as possible, aerodynamic drag from gas on the test masses 22 and 24 when they freefall. Eliminating the aerodynamic drag on the freefalling test masses 22 and 24 allows them to freefall without substantial adverse influence from factors other than gravity. The rigid body 114 and shock mounts 116 are also enclosed within the vacuum chamber 126 of the housing 118.

An elevator 128 supports and moves the test masses 22 and 24 within the vacuum chamber 126. The elevator 128 moves vertically downward at an acceleration rate greater than that of gravity to release the test masses 22 and 24 to fall freely solely under the influence of gravity within the vacuum chamber 126. The elevator 128 also slows its descent to catch the test masses 22 and 24 at the end of their simultaneous freefall. The elevator 128 lifts both test masses 22 and 24 upward to a position where they can again be released for simultaneous freefall. The test masses 22 and 24 are typically released for simultaneous freefall, caught at the end of the simultaneous freefall, lifted, and again released for simultaneous freefall in multiple repetitions during a typical measurement of the gravity gradient.

The retroreflectors 40, 42, 44, 46, 48 and 50, and the corner cube structures 72, 74, 76, 78, 80 and 82, are preferably of the open variety, but the corner cube structures and the retroreflectors may also be of the closed variety. A closed retroreflector is constructed of a body of solid glass or other high-grade transparent optical material. The three mutually perpendicular wall surfaces are machined or otherwise formed on the body. The wall surfaces are coated with a reflective material to reflect light impinging on the wall surfaces, or in the case of the polarized beam directors 66, 68 and 70, some of the three mutually perpendicular wall surfaces are coated with the polarized beam splitting material and each remaining wall surface is coated with a mirror or reflective material. An incident light beam passes through the body of the closed corner cube structure or retroreflector while reflecting from the three mutually perpendicular reflective wall surfaces and exits the body of the corner cube structure or retroreflector as the reflected beam that projects parallel to the incident beam. In the case of a polarized beam director, the incident light beam with polarization which is aligned with the polarizing characteristics of the polarized beam splitters passes through the body, but a different incident light beam with a plane of polarization perpendicular to the polarizing characteristics of the polarized beam splitters passes through the body before being reflected.

A closed corner cube structure or retroreflector has the effect of changing the speed of the light beam passing through the changed medium of the optical body of the corner cube structure retroreflector. Using open corner cube structures or retroreflectors causes the speed of light to remain constant throughout the entire beam path segments 32*a*, 32*b* and 34*a* (FIG. 1), because the light beams 26 and 28 do not pass through an optical body, thereby avoiding any phase or path length differences that might be created by conducting the light beams through a different medium. It is for this reason that open corner cube structures and retroreflectors are preferred.

Increasing the number of interference fringes facilitates detection of the gradient of gravity. One way to increase the number of interference fringes is to allow the test masses to fall freely for a substantial distance, thereby achieving more relative separation difference between the test masses at the end of simultaneous freefall. This solution is usually impractical because a commercial embodiment of the gradiometer is usually not large enough to accommodate the increased freefall distance of the test masses.

Another way to increase the number of interference fringes is by imparting a finite velocity to one of the test masses compared to the other test mass at the commencement of simultaneous freefall, or by artificially accelerating one of the test masses while allowing natural gravity to accelerate the other test mass at the commencement of simultaneous freefall. These actions change the lengths of the beam paths 32 and 34 more than they would otherwise change if the two test masses were released simultaneously for freefall, thereby creating more interference fringes. To release one test mass for freefall before the other test mass is released for freefall, or artificially accelerating one of the test masses but not the other, requires a support device (not shown) on the elevator 128 which releases each test mass differently and independently for freefall.

Figure 8:
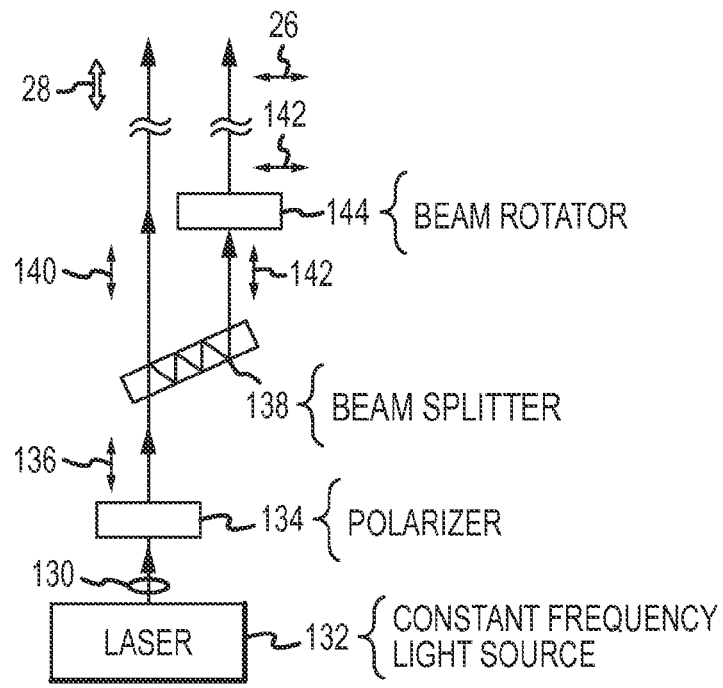
FIG. 8 is an exemplary block diagram of optical components which create two input light beams of mutually different planes of polarization supplied to the gradiometer shown in FIG. 1.

The two polarized light beams 26 and 28 at the input point 30 (FIG. 1) are derived, as shown in FIG. 8, from a single constant-frequency light beam 130 supplied by a constant frequency light source such as a laser 132. The light beam 130 is directed through a polarizer 134 which creates a single polarized light beam 136 having a defined plane of polarization, for example vertical (as shown). The polarized light beam 136 is then passed through a beam splitter 138 which creates two similarly polarized light beams 140 and 142 from the single polarized light beam 136. One of the polarized light beams, for example light beam 142 is then passed through a beam rotator 144 to change its polarization plane, preferably to a perpendicular polarization plane relative to the light beam 140. The mutually different polarized light beams 140 and 142 are supplied as the light beams 26 and 28 at the input point 30 (FIG. 1). Under these circumstances, both light beams 26 (140) and 28 (142) have exactly the same frequency and phase relationship at the input point 30 (FIG. 1), since both were derived from the single constant frequency light beam 130.

Figure 9:
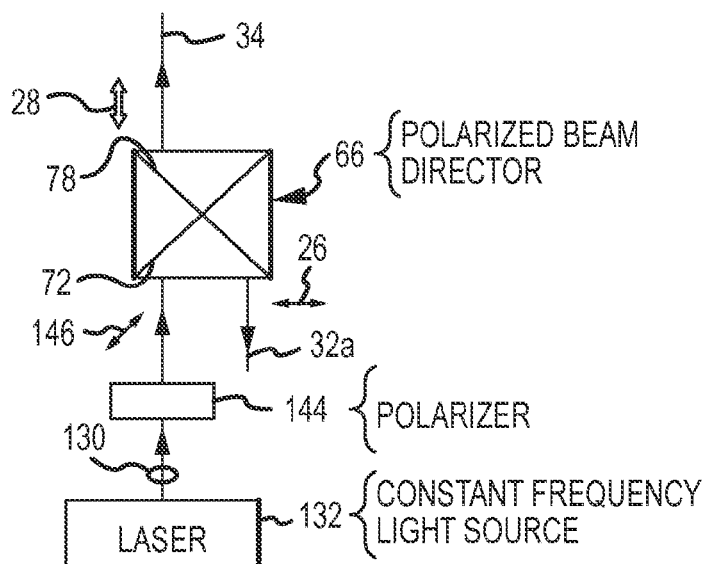
FIG. 9 is an exemplary block diagram of optical components which create two input light beams of mutually different planes of polarization supplied to the gradiometer shown in FIG. 1, which is an alternative to the optical components shown in FIG. 8.

An alternative source of the polarized light beams 26 and 28 at the input point 30 (FIG. 1) is shown in FIG. 9. The single polarized light beam 130 from the laser 132 is directed to a polarizer 144. The polarizer 144 delivers a light beam 146 which has a plane of polarization at an angle relative to both of the different planes of polarization of the light beams 26 and 28 (FIG. 1). Preferably, the defined polarization of the light beam 146 is approximately at half of the relative angle between the differently polarized light beams 26 and 28, for example 45°. The light beam 146 is then supplied to the polarized beam director 66 (FIG. 1). The downward facing corner cube structure 72 of the polarized beam director 66 thereafter separates the energy of the incident light beam 146 into the differently polarized input light beams 26 and 28. The beam splitter walls of the downward facing corner cube structure 72 allow the vertical light energy from the light beam 146 parallel to the alignment of the polarizing characteristics of the polarized beam splitter walls to pass through the lower polarized beam director 66 as the light beam 28 in the beam path 34 (FIG. 1), while the same beam splitter walls of the corner cube structure 72 reflect horizontal light energy from the light beam 146, which is perpendicular to the alignment of the polarizing characteristics of the polarized beam splitter walls, as the light beam 26 into the beam path segment 32a. The light passing through the polarized beam director 66 becomes the polarized light beam 28, and the light reflecting from the polarized beam director 66 becomes the mutually perpendicular polarized light beam 26 (FIG. 1). Under these circumstances, both light beams 26 and 28 have exactly the same frequency at the input point 30 (FIG. 1), since both were derived from the single constant frequency light beam 130.

Figure 10:
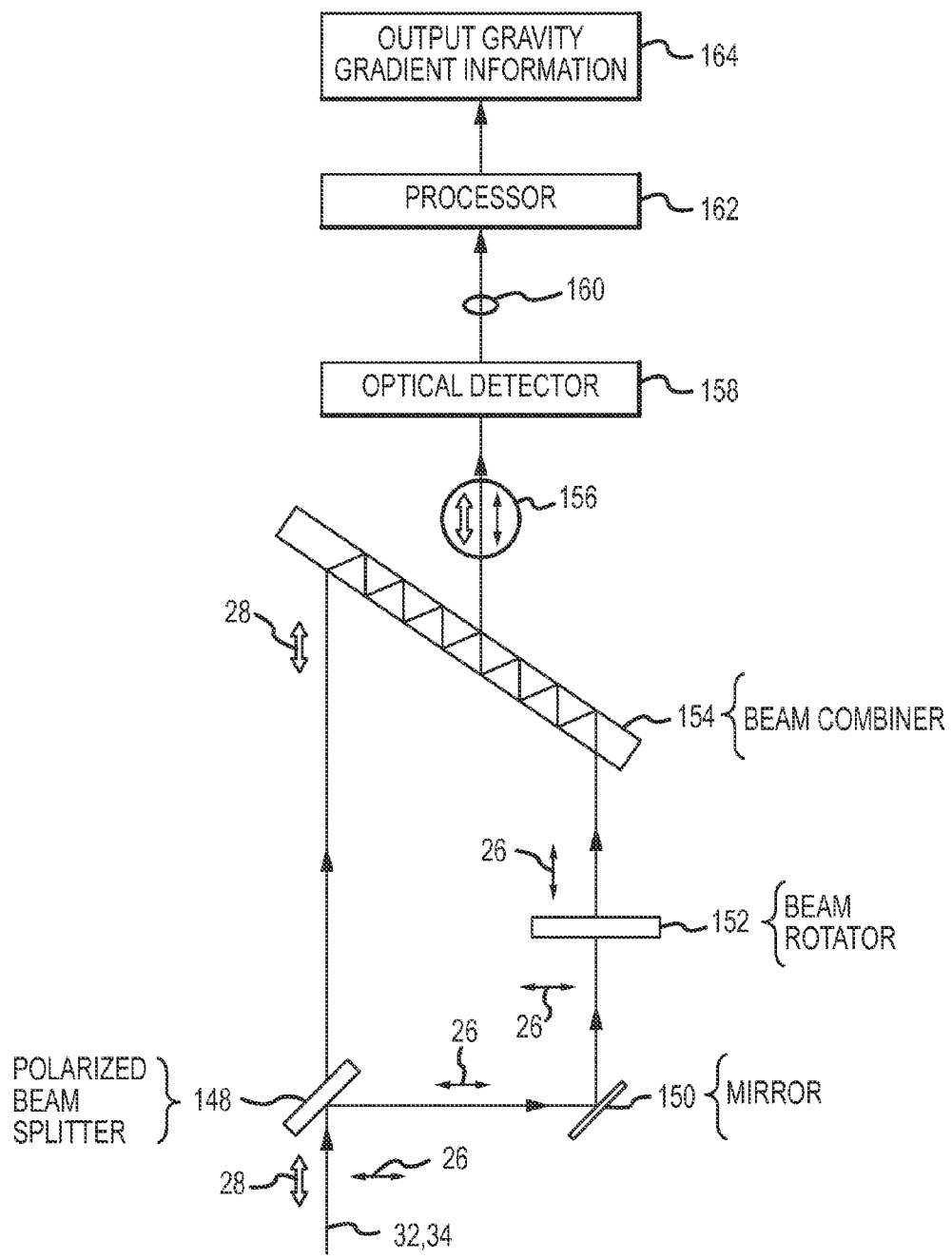
FIG. 10 is an exemplary block diagram of optical components which combine two output light beams of mutually different planes of polarization supplied by the gradiometer shown in FIG. 1 to measure a gradient of gravity.

The light beams 26 and 28 at the output point 36 (FIG. 1) are combined, and the fringes created by the combination are detected, and the gradient of gravity is measured, by the exemplary components shown in FIG. 10. After interacting with the test masses 22 and 24 during simultaneous freefall and passing along the coincident beam paths 32 and 34 to the output point 36, the differently polarized light beams 26 and 28 are applied to a polarized beam splitter 148. The polarized beam splitter 148 has the same optical characteristics as each polarized beam splitter wall 90, 92, 96 and 98 of the polarized beam director 84 (FIGS. 3, 4A and 4B). Consequently, the light beam 28 passes through the beam splitter 148 because the light beam has a polarization plane aligned with the polarizing plane of the beam splitter 148. The other light beam 26 is reflected because it has a polarization plane perpendicular to the polarizing plane by the beam splitter 148. The reflected light beam 26 is thereafter applied to mirror 150 and is reflected to a beam rotator 152. The beam rotator 152 rotates the light beam 26 to a vertical polarization (as shown) which is parallel to the polarization plane of the light beam 28.

The light beams 26 and 28 are thereafter combined by directing them onto a conventional beam combiner 154, and the beam combiner 154 supplies a combined light beam 156. The combined light beam 156 contains the interference fringes 112 (FIG. 5). The combined beam 156 is then directed to an optical detector 158. The optical detector 158 generates electrical signals 160 which correspond to the occurrence, amplitude and timing of the interference fringes of the combined light beams 26 and 28. A processor 162 responds to signals 160 from the detector 158 which represent the interference fringes to determine the gradient of gravity, using known interferometric analysis and processing techniques. The determined gradient of gravity is supplied as output information 164.

Figure 11:
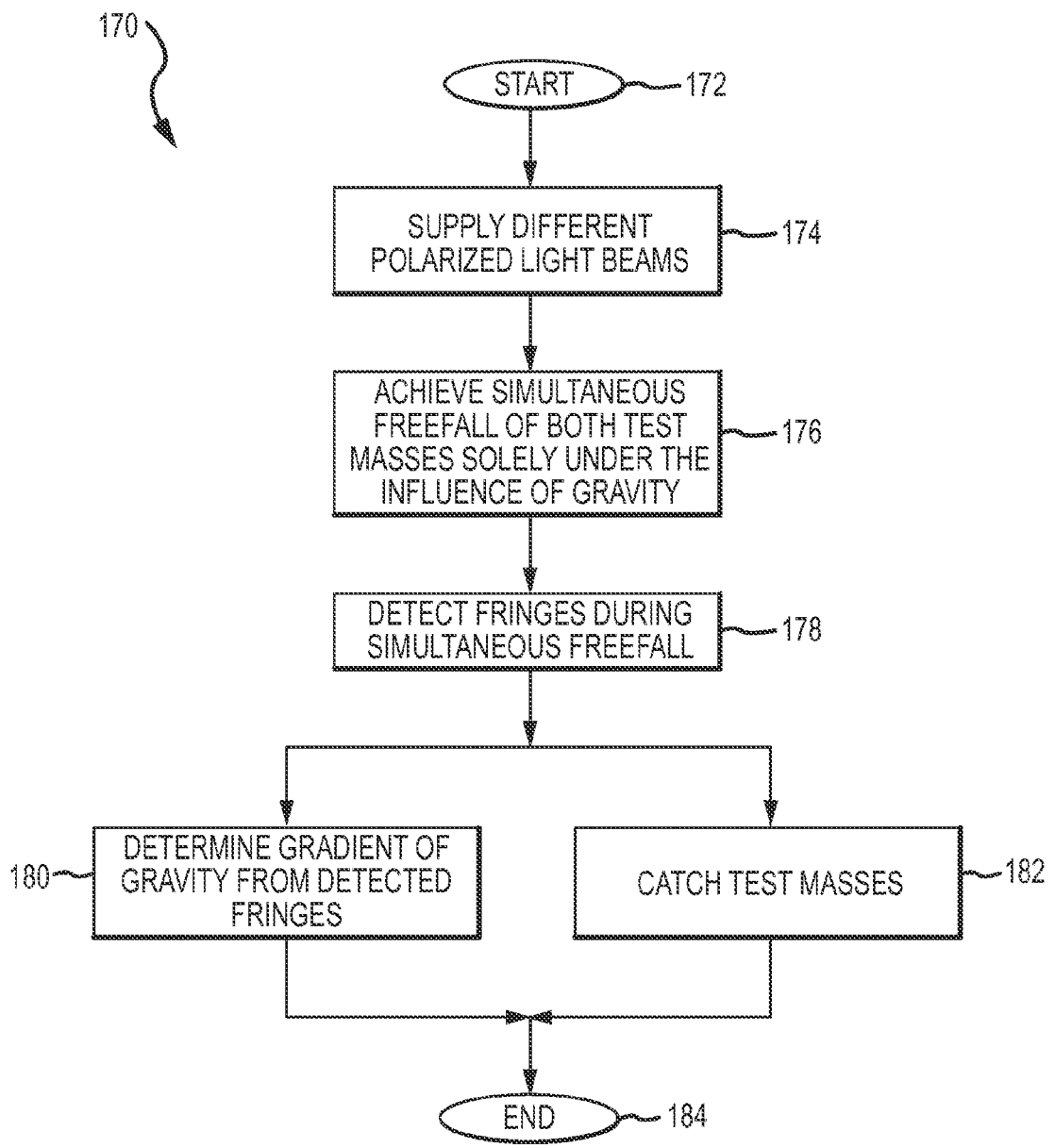
FIG. 11 is a flow chart of a process flow employed in obtaining a gradient of gravity measurement using the gradiometer shown in FIG. 1.

An exemplary process flow 170 for determining the gradient of gravity using the gradiometer 20 is illustrated in FIG. 11. The process flow 170 begins at 172. At 174, the mutually differently polarized light beams 26 and 28 which have the same frequency are supplied at the input point 30 (FIG. 1). Both test masses are allowed to freefall simultaneously solely under the influence of gravity at 176, after any initial velocity difference has been optionally imparted.

After the polarized light beams 26 and 28 have interacted with the freefalling test masses 22 and 24 and passed through the coincident beam paths 32 and 34 (FIG. 1), the light beams 26 and 28 from the output point 36 (FIG. 1) are combined and applied to the detector 158 (FIG. 10) at 180. The output signal 160 (FIG. 10) containing the interference fringe information is processed by the processor 162 (FIG. 10) at 180, to directly determine the gradient of gravity from the detected fringes. The interference fringes processed at 180 were obtained while the test masses were in simultaneous freefall solely under the influence of gravity. Either simultaneously with or before or after determining the gravity gradient at 180, the elevator 128 (FIG. 6) is operated to catch the test masses and thereby stop their freefall, at 182. Thereafter, the process flow 170 ends at 184. The process flow 170 is repeated with each subsequent determination of the gradient of gravity.

One of the benefits of the present invention is that the gradient of gravity is determined and made available very quickly after the termination of the simultaneous freefall of the test masses. The interference fringe characteristics directly define the gradient of gravity, thereby achieving an immediate value of the gradient of gravity.

The advantageous common mode rejection characteristics of the gradiometer allow it to be employed successfully and accurately in a vibration-prone environment such as in a moving vehicle, for example an airplane, automobile, ship, submarine or spacecraft, particularly when the gradiometer 20 is attached to a gimble (not shown). The superior common mode rejection characteristics of the gradiometer reduce or eliminate the effects of vibration-related noise.

Figure 12:
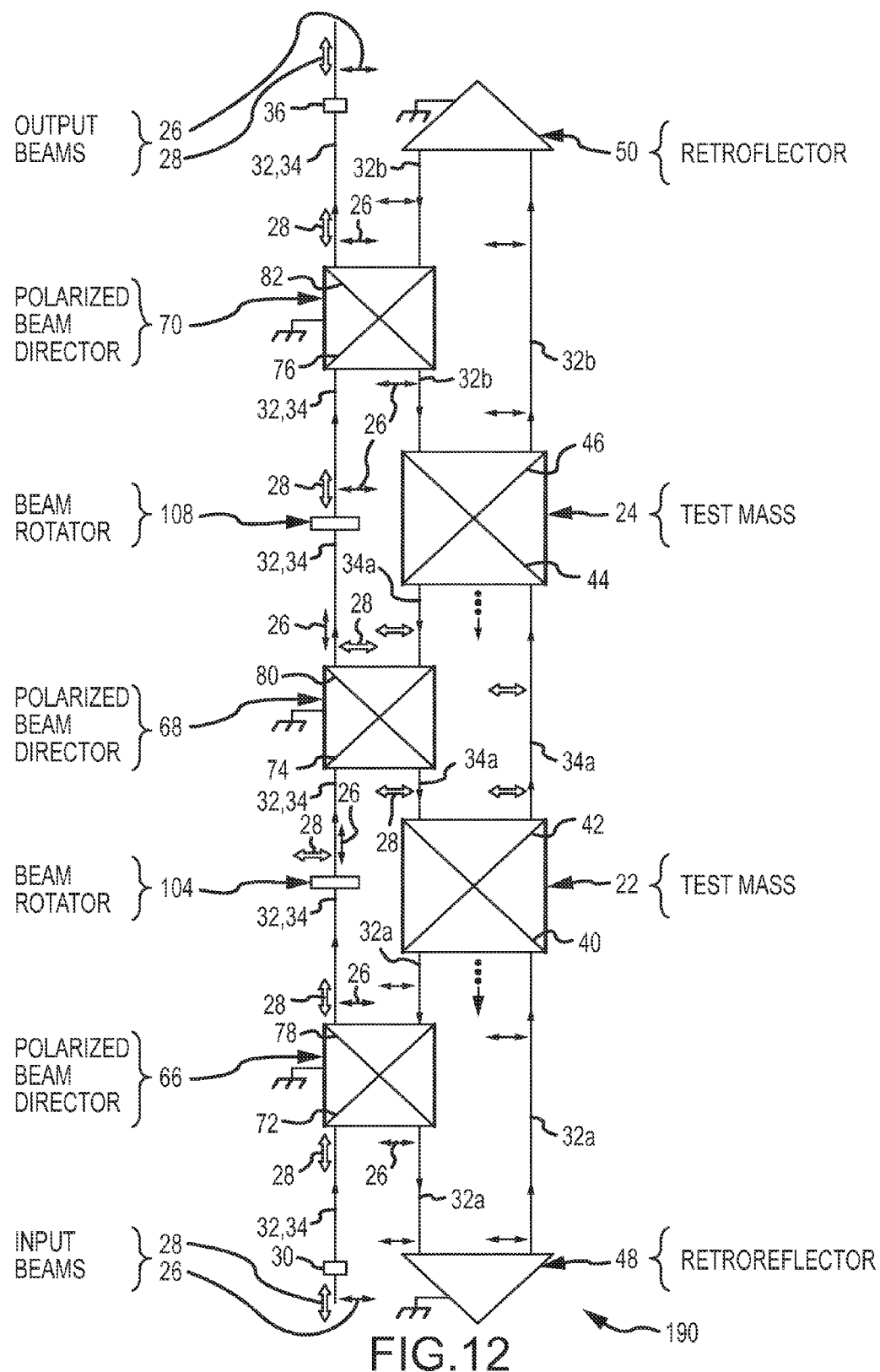
FIG. 12 is a schematic diagram of optical aspects of another embodiment of an interferometric gradiometer which embodies the present invention.

Another embodiment 190 of the gradiometer of the present invention is shown in FIG. 12. The gradiometer 190 is similar to the gradiometer 20 (FIG. 1), except that the light beams 26 and 28 respectively traverse the beam path segments 32a, 32b and 34a only once, unlike the gradiometer 20 where the light beams 26 and 28 respectively traverse the beam path segments 32a, 32b and 34a twice. Also, the gradiometer 190 does not utilize the beam rotators 70, 74 and 78 in the beam path segments 32a, 32b and 34a. Consequently, at the end of the first traversal of each of the beam path segments 32a, 32b and 34a by the light beams 26 and 28, respectively, the upward facing corner cube structures 78, 80 and 82 of the polarized beam directors 66, 68 and 70 (FIG. 1) return the diverted light beams 26 and 28 from the beam path segments to the coincident beam paths 32 and 34. Furthermore, because the polarized beam directors 66, 68 and 70 need only reflect the divergent light beams 26 and 28 from the beam path segments 32a, 32b and 34a back into the coincident beam paths 32 and 34, and not pass the divergent light beams in two traversals, only one of the mutually perpendicular surfaces of the corner cube structures 72, 74, 76, 78, 80 and 82 need be formed as a polarized beam splitter.

Because the light beams 26 and 28 traverse the beam path segments 32a, 32b and 34a only once, the amplification factor of the gradiometer 190 is four. The application factor of four is derived in exactly the same manner as described in conjunction with the gradiometer 20, except that there is no added amplification of two resulting from two traversals of the beam path segments 32a, 32b and 34a.

The gradiometer 190 is useful in situations where are the optical power of the light beams 26 and 28 at the input point 30 is insufficient to make the two traversals of the beam path segments 32a, 32b and 34a. Each time the light beam encounters an optical element, some of its power is lost as a result of the pass-through, reflection, rotation, polarization or other influences of the optical element on the light beam. In those situations where are the amount of power from the input light beams 26 and 28 cannot be increased or is limited for some reason, the gradiometer 190 provides all of the benefits and improvements described above except those of the enhanced amplification factor of eight and eliminating second order effects.

Many significant improvements result from the present invention, as previously discussed and reiterated below. Utilizing polarized light beams 26 and 28 which traverse coincident beam paths 32 and 34, except in the divergent beam path segments 32a, 32b and 34a, causes aberrant perturbations to equally affect both beam paths 32 and 34, thereby achieving enhanced common mode rejection of the optical effects caused by those aberrant perturbations when the output light beams are combined. Attaching the retroreflectors 48 and 50 and the polarized beam directors 66, 68 and 70 to the super rigid body 114 (FIG. 6) causes any aberrant perturbations to affect those stationary elements equally, leading to equal influences on the beam paths 32 and 34 and thereby facilitating cancellation of those influences by common mode rejection. Balancing the test masses 22 and 24 with their centers of mass 122 relative to the optical center points 120 (FIG. 7) of the retroreflectors 40, 42 and 44, 46, creates equal and opposite relative length changes of the beam paths 32 and 34, with any rotation of the test masses that might occur during freefall. The parallel beam paths within the gradiometer 20 also avoid inaccuracies created by differing lengths of the beam paths 32 and 34, to facilitate accuracy of measurement. Second order effects are eliminated in the gradiometer 20. Reflecting both polarized light beams 26 and 28 from both test masses 22 and 24 (FIG. 1), also assists in creating sufficient interference fringes and amplification to determine the gravity characteristic accurately and to distinguish those interference fringes from background noise.

The amplification factor of eight in the gradiometer 20 represents an improvement in measurement resolution. The practical benefit of the increased amplification factor is that the test masses do not require as much distance to freefall to achieve adequate measurement resolution, compared to the freefall distance required with a lower amplification factor. A gradiometer with a higher amplification factor can be made smaller and more compact than a gradiometer having a lower amplification factor.

Many other advantages and improvements will become apparent upon fully appreciating the many aspects of the present invention. Presently preferred embodiments of the present invention and many of its improvements have been described with a degree of particularity. This description is of preferred examples of implementing the invention, and is not necessarily intended to limit the scope of the invention. Aspects of the invention may be embodied in other devices and methods for measuring a characteristic of gravity. The scope of the invention is defined by the scope of the following claims.

What is claimed:

1. An interferometric gradiometer comprising upper and lower test masses and optical elements which interact with first and second polarized light beams having respectively different planes of polarization in a coincident beam path to divert the first light beam from the coincident beam path to impinge upon and reflect from an upper surface of the upper test mass in freefall and a lower surface the lower test mass in freefall and to divert the second light beam from the coincident beam path to impinge upon and reflect from a lower surface of the upper test mass in freefall and an upper surface of the lower test mass in freefall.

2. An interferometric gradiometer as defined in claim 1, wherein the optical elements maintain one of the light beams in the coincident beam path when the other one of the light beams is diverted from the coincident beam path.

3. An interferometric gradiometer as defined in claim 2, wherein the optical elements direct each of the diverted light beams to rejoin the coincident beam path after diversion.

4. An interferometric gradiometer as defined in claim 3, wherein each diverted light beam impinges upon and reflects from each of the surfaces of each of the test masses multiple times before rejoining the coincident beam path.

5. An interferometric gradiometer as defined in claim 3, wherein the first and second diverted light beams traverse respectively different beam path segments when impinging upon and reflecting from the surfaces of the test masses, and the optical elements direct each diverted light beam to traverse its respective beam path segment multiple times before rejoining the coincident beam path.

6. An interferometric gradiometer as defined in claim 3, wherein the first and second diverted light beams traverse respectively different beam path segments when impinging upon and reflecting from the surfaces of the test masses, and each beam path segment extends substantially parallel to the coincident beam path.

7. An interferometric gradiometer as defined in claim 3, wherein the upper and lower surfaces of the test masses upon which the light beams impinge and reflect constitute retroreflectors positioned to equally change the path length of the first and second light beams upon any rotation of either test mass during freefall.

8. An interferometric gradiometer as defined in claim 3, wherein the optical elements rotate each of the diverted first and second light beams before the light beams rejoin the coincident beam path.

9. An interferometric gradiometer as defined in claim 3, wherein the optical elements rotate both the first and second light beams in the coincident beam path after the first light beam rejoins the coincident beam path and before the second light beam is diverted from the coincident beam path.

10. An interferometric gradiometer operative in response to first and second polarized light beams, comprising:
upper and lower test masses which freefall simultaneously under the influence of gravity at a spatially separated distance from one another, each test mass having a downward light beam reflector and an upward light beam reflector which respectively face in the same and opposite directions of freefall;
optical elements which conduct the first and second light beams in a coincident beam path; and wherein:
the optical elements include beam directors which divert the first light beam from the coincident beam path into a first beam path segment while the second light beam remains in the coincident beam path and which divert the second light beam from the coincident beam path into a second beam path segment while the first light beam remains in the coincident beam path, the first light beam impinging upon and reflecting from the downward reflector of the lower test mass and the upward reflector of the upper test mass in the first beam path segment, the second light beam impinging upon and reflecting from the upward reflector of the lower test mass and the downward reflector of the upper test mass in the second beam path segment, the beam directors further directing each of the first and second diverted light beams to rejoin the coincident beam path after traversing the first and second beam path segments; and the first and second light beams are polarized in mutually different planes of polarization when traversing the coincident beam path.

11. An interferometric gradiometer as defined in claim 10, wherein the optical elements direct each of the first and second light beams to traverse the first and second beam path segments, respectively, multiple times before rejoining the coincident beam path.

12. An interferometric gradiometer as defined in claim 11, wherein:

the optical elements include beam rotators located in each first and second beam path segments to rotate the diverted light beam in the beam path segment before rejoining the coincident beam path.

13. An interferometric gradiometer as defined in claim 10, wherein:

each beam director includes two corner cube structures which face in opposite directions and are vertically aligned with one another;

each corner cube structure of each beam director includes three mutually perpendicular walls, first and second ones of the three walls include polarized beam splitting material which has a polarizing characteristic that passes a polarized light beam which is aligned with the polarizing characteristic and which reflects a polarized light beam which is perpendicular to the polarizing characteristic, a third one of the three walls includes mirror material which reflects all light beams;

the first and second walls of the two corner cube structures are vertically aligned with one another in each beam director;

the third walls of the two retroreflectors are vertically aligned with one another in each beam director;

the polarizing characteristic of the beam splitting material of the first and second walls of both corner cube structures have a common alignment in each beam director; and one of the first and second polarized light beams in the coincident beam path has a plane of polarization which is aligned with the polarizing characteristic of the first and second walls of both corner cube structures of each beam director, and the other one of the first and second light beams from the beam path segments rejoin the coincident beam path with planes of polarization which are mutually different from the polarizing characteristic of the beam splitting material.

14. An interferometric gradiometer as defined in claim 10, further comprising:

a rigid body which is rigidly connected to support each of the beam directors in a fixed relationship with each other beam director.

15. An interferometric gradiometer as defined in claim 14, wherein:

the optical elements includes at least one stationary retroreflector positioned to interact with the first light beam in the first beam path segment; and the rigid body is rigidly connected to each one stationary retroreflector to support each one stationary retroreflector in a fixed relationship with the beam directors.

16. An interferometric gradiometer as defined in claim 14, wherein:

the optical elements include lower, intermediate and upper beam directors;

the optical elements also include upper and lower stationary retroreflectors;

the rigid body is rigidly connected to support the lower stationary retroreflector below the lower test mass and to support the upper stationary retroreflector above the upper test mass; and the rigid body positions the lower beam director between the lower stationary retroreflector and the lower test mass, positions the intermediate beam director between the lower and upper test masses, and positions the upper beam director between the upper stationary retroreflector and the upper test mass.

17. An interferometric gradiometer as defined in claim 16, wherein the optical elements include:

one beam rotator located in the coincident beam path between the lower and intermediate beam directors to rotate the first and second light beams in the coincident beam path before the first and second light beams encounter the intermediate beam director; and another beam rotator located in the coincident beam path between the intermediate and upper beam directors to rotate the first and second light beams in the coincident beam path before the first and second light beams encounter of the upper beam director.

18. An interferometric gradiometer as defined in claim 10, wherein:

the downward and upward light beam reflectors of each test mass constitute retroreflectors each of which has an optical center point;

each test mass has a center of gravity point about which each test mass rotates if rotation occurs during freefall;

the optical center points of the downward and upward retroreflectors are positioned on the test mass equidistantly from the center of gravity point; and the optical center points and the center of gravity point are colinear.

19. A method of increasing the amplification factor beyond a value of four in an interferometric gravity characteristic measurement instrument which includes vertically separated upper and lower test masses which freefall simultaneously and a first light beam which traverses a first beam path segment to impinge upon and reflect from a lower surface of the lower test mass and an upper surface of the upper test mass and a second light beam which traverses a second beam path segment to impinge upon and reflect from an upper surface of the lower test mass and a lower surface of the upper test mass, comprising:

directing the first light beam to traverse the first beam path segment multiple times;

directing the second light beam to traverse the second beam path segment multiple times; and combining the first and second light beams after each has traversed the first and second beam paths multiple times.

20. A method as defined in claim 19, further comprising:

using polarized first and second light beams to traverse the first and second beam path segments; and rotating each of the polarized first and second light beams with each respective traversal of the first and second beam path segments.

21. A method of determining a gradient of gravity, comprising:

freefalling upper and lower test masses simultaneously;

directing first and second polarized light beams having respectively different planes of polarization in a coincident beam path;

diverting the first light beam from the coincident beam path into a first beam path segment to impinge upon and reflect from an upper surface of the upper test mass in freefall and a lower surface the lower test mass in freefall;

diverting the second light beam from the coincident beam path into a second beam path segment to impinge upon and reflect from a lower surface of the upper test mass in freefall and an upper surface of the lower test mass in freefall;

rejoining each diverted light beam with the other light beam in the coincident beam path after each light beam has traversed its respective beam path segment;

combining the first and second light beams after each light beam has traversed its respective beam path segment; and determining the gradient of gravity from interference characteristics of the combined first and second light beams.

22. A method as defined in claim 21, further comprising:
directing each light beam to traverse its respective beam path segment multiple times before rejoining the coincident beam path.

23. A method as defined in claim 21, further comprising:
directing each light beam to traverse its respective beam path segment multiple times before rejoining the coincident beam path; and
rotating each light beam in its respective beam path segment with each traversal of that beam path segment to preserve information from a previous traversal of that beam path segment.

24. A method as defined in claim 21, further comprising:
orienting each beam path segment to extend substantially parallel to the coincident beam path.

25. A method as defined in claim 21, further comprising:
equally changing the optical lengths of both the first and second beam path segments upon any rotation of either test mass during freefall.

26. A method as defined in claim 21, wherein each of the first and second beam path segments has an optical path length, and further comprising:
increasing the optical path length of one beam path segment and simultaneously decreasing the optical path length of the other beam path segment during simultaneous freefall of the test masses.

27. A method as defined in claim 21, wherein each of the first and second light beams has an optical path length in the coincident beam path, and further comprising:
equally changing the optical path length of the first and second light beams in the coincident beam path arising from perturbation of optical elements in the coincident beam path.

28. A method as defined in claim 21, further comprising:
rotating the first and second light beams in the coincident beam path after the first light beam rejoins the coincident beam path and before the second light beam is diverted from the coincident beam path.

29. An interferometric gradiometer as defined in claim 4, wherein each diverted light beam is rotated before rejoining the coincident beam path.

30. An interferometric gradiometer as defined in claim 5, wherein each diverted light beam is rotated before rejoining the coincident beam path to preserve information from a previous traversal of that beam path segment.

31. An interferometric gradiometer as defined in claim 11, wherein each of the first and second light beams is rotated in its respective beam path segment with each traversal of that beam path segment to preserve information from a previous traversal of that beam path segment.

32. A method as defined in claim 20, further comprising:
rotating each of the polarized first and second light beams in its respective beam path segment with each traversal of that beam path segment to preserve information from a previous traversal of that beam path segment.

33. An interferometric gradiometer as defined in claim 4, wherein the optical elements combine the first and second light beams after each light beam has rejoined the coincident beam path, and the gradient of gravity is determined from interference characteristics of the combined first and second light beams.

34. An interferometric gradiometer as defined in claim 1, wherein the optical elements direct each of the diverted light beams to rejoin the coincident beam path after diversion.

35. An interferometric gradiometer as defined in claim 10, wherein the optical elements combine the first and second light beams after each light beam has rejoined the coincident beam path, and the gradient of gravity is determined from interference characteristics of the combined first and second light beams.

36. A method as defined in claim 19, further comprising:
measuring a characteristic of gravity from interferometric information contained in the combined first and second light beams.

* * * * *